(12) United States Patent
Gaston et al.

(10) Patent No.: US 6,546,297 B1
(45) Date of Patent: Apr. 8, 2003

(54) DISTRIBUTED LIFE CYCLE DEVELOPMENT TOOL FOR CONTROLS

(75) Inventors: Michael T. Gaston, Richmond, VA (US); David Cook, Richmond, VA (US); Goutam Gandhi, Richmond, VA (US); Gary D. Hedrick, Richmond, VA (US); Victor L. Potter, Glen Allen, VA (US); Carl J. Lecheler, Glen Allen, VA (US); Timothy S. Matt, Richmond, VA (US)

(73) Assignee: Robertshaw Controls Company, Richmond, VA (US)

( * ) Notice: Subject to any disclaimer, the term of this patent is extended or adjusted under 35 U.S.C. 154(b) by 0 days.

(21) Appl. No.: 09/378,509

(22) Filed: Aug. 20, 1999

Related U.S. Application Data

(60) Provisional application No. 60/106,804, filed on Nov. 3, 1998, and provisional application No. 60/112,964, filed on Dec. 18, 1998.

(51) Int. Cl.[7] .............................................. G05B 19/42
(52) U.S. Cl. ............................. 700/83; 700/17; 700/97; 700/86; 345/762; 345/763
(58) Field of Search ............................. 700/17, 86, 83, 700/97; 345/762, 763, 765, 771, 773, 964–965, 967, 970; 717/1

(56) References Cited

U.S. PATENT DOCUMENTS

| | | | |
|---|---|---|---|
| 4,627,056 A | 12/1986 | Awane et al. ................. | 714/25 |
| 5,301,336 A | 4/1994 | Kodosky et al. ............ | 345/846 |
| 5,812,394 A | 9/1998 | Lewis et al. ................... | 700/17 |
| 5,988,852 A * | 11/1999 | Nakanishi ..................... | 700/83 |
| 6,344,861 B1 * | 2/2002 | Naughton et al. .......... | 345/769 |
| 6,396,516 B1 * | 5/2002 | Beatty ........................ | 345/764 |
| 6,424,883 B1 * | 7/2002 | Hosokawa et al. ......... | 700/181 |

FOREIGN PATENT DOCUMENTS

| | | | |
|---|---|---|---|
| EP | 0 802 494 | 10/1997 | ........... G06F/17/50 |

OTHER PUBLICATIONS

PCT International Search Report; Apr. 13, 2000; PCT/US99/25618.

A. R. Kemp et al.; "Support Systems For The Ontario Hydro Programmable Controller"; IEEE Transactions on Power Apparatus and Systems; vol. PAS–102, No. 1; Jan. 1983.

(List continued on next page.)

*Primary Examiner*—Thomas Black
*Assistant Examiner*—Crystal J. Barnes
(74) *Attorney, Agent, or Firm*—McDermott, Will & Emery

(57) ABSTRACT

A control system for a device, such as an appliance, is designed by storing software representations of pre-existing control panel components (2005) and pre-existing control processes (2010) on a computer, using the computer to develop a control panel for the device by selecting and placing software representations of pre-existing control panel objects in a software representation of the control panel (2015), and using the computer to develop control software for the device by selecting software representations of pre-existing control processes and associating the selected control processes with the selected control panel objects (2020). The control software then is downloaded from the computer to control hardware to be included in the device (2025). Finally, the device is tested using the control software running on the control hardware and under the control of the computer (2030). A system (2100) for designing a control system for a device (2105) includes a computer (2110) having an input unit (2115), an output unit (2120), a processor (2125), a storage device (2130) on which the software representations (2140) are stored, and a display (2135) on which a representation of the control panel is presented. The system also includes control hardware (2145) connected to active components (2150) of the device (2105) and operable to receive data from the output unit (2120) of the computer (2110). The processor (2125) is programmed to generate the control system in the manner discussed above.

64 Claims, 27 Drawing Sheets

OTHER PUBLICATIONS

David R. Gonzales; "Tool Reusable for DSP System Emulation and Board Production Testing"; Apr. 11, 1996; p. 306–311.

"Visual Lab M"; 1997, pp. 55–60.

Jacob Goldman; "An Ideal Couple The PC and ATE"; EE–Evaluation Engineering ; Jun. 1996, pp. 58, 61–63.

G. D. Swanson et al.; "Modernizing a High–Volume Production Test System"; VI Engineering, Inc., 1996.

* cited by examiner

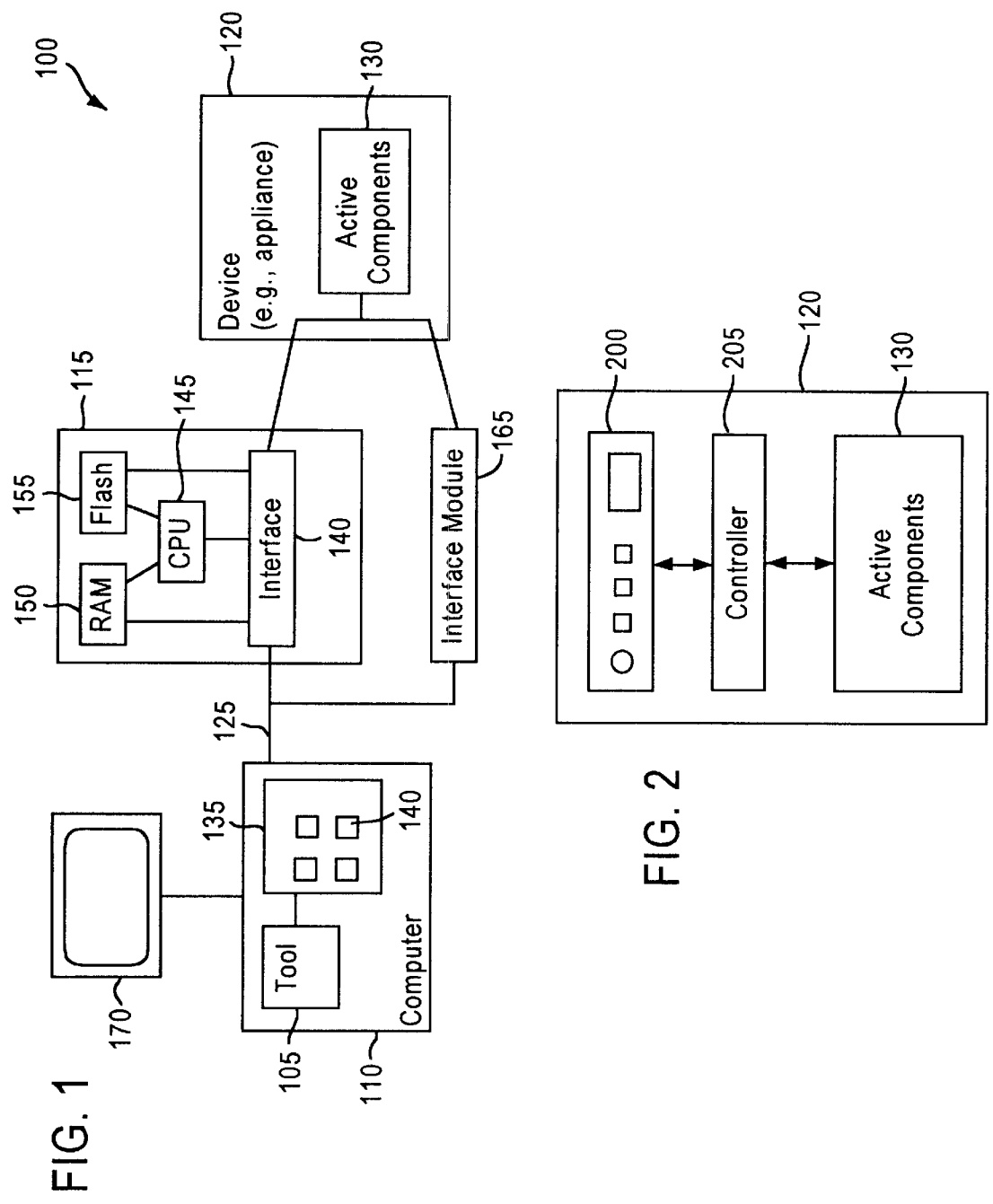

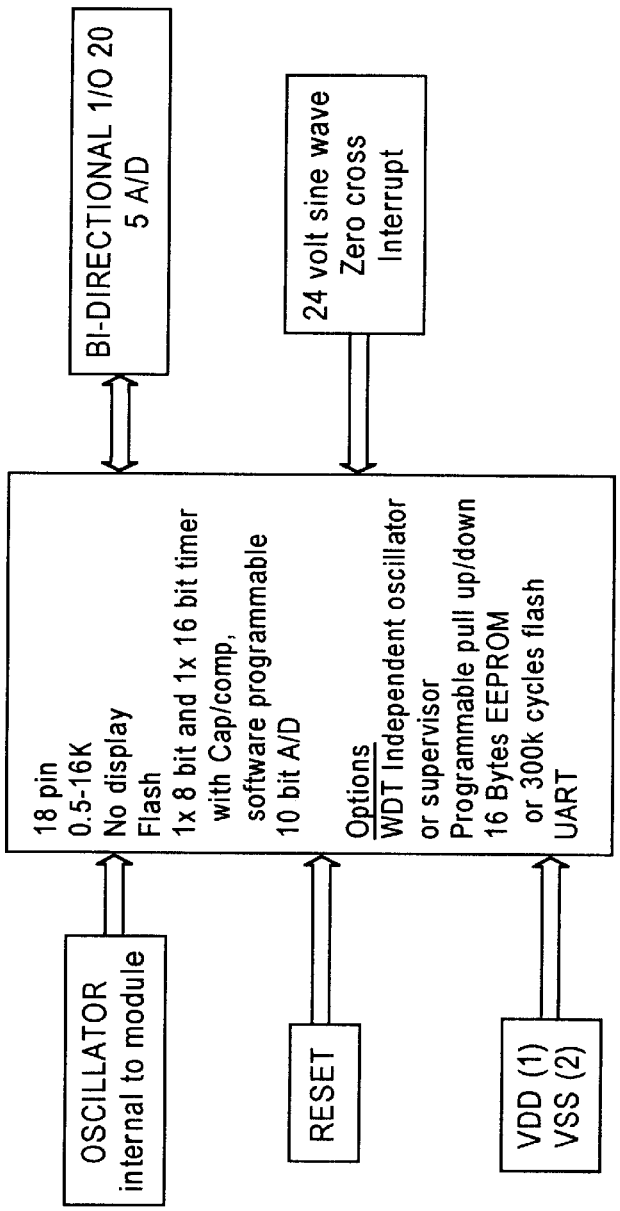
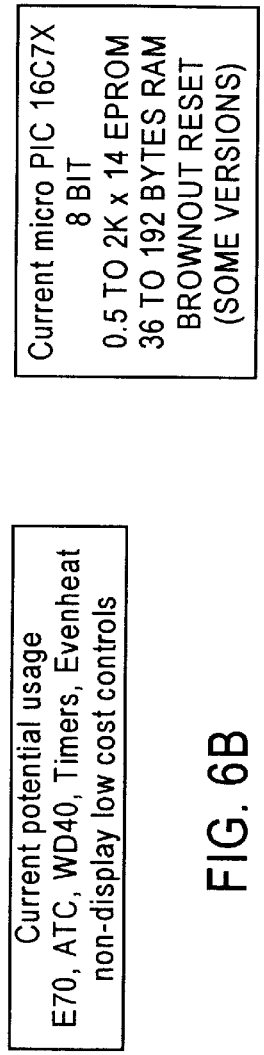
FIG. 6B

DISTRIBUTED LIFE CYCLE DEVELOPMENT TOOL FOR CONTROLS

CROSS REFERENCE TO RELATED APPLICATIONS

This application claims priority from U.S. Provisional Application Nos. 60/106,804, filed Nov. 3, 1998, and Ser. No. 60/112,964, filed Dec. 18, 1998, both of which are titled "DISTRIBUTED LIFE CYCLE DEVELOPMENT TOOL FOR CONTROLS".

TECHNICAL FIELD

The invention relates to designing controls for appliances, machines, machine tools, and other devices.

BACKGROUND

Typically, development of a new product, such as an appliance, starts with the manufacturer writing a system requirements specification. This specification is sent to various engineering firms with a request for proposal. Each engineering firm provides a proposal and cost estimate to the manufacturer. The manufacturer evaluates the proposals and selects a short list of engineering firms. The manufacturer then asks these firms to submit firm quotes for the new product based on their proposals.

Finally, the manufacturer reviews all firm quotes and selects one engineering firm to produce the new product. This is a long and laborious process that usually takes three to nine months with only one tangible result: a firm proposal for development of a new product.

The next step in the process is for the manufacturer and the selected engineering firm to develop a detailed design specification for the new product. This development usually takes three to six months.

The final step in the process is to produce a prototype system based on the detailed design specification. Once the prototype is complete, the new system is extensively tested by the engineering firm and by the manufacturer. After all regression and acceptance testing is complete, the system is tested for certification to ensure it meets all applicable government requirements for safety and operation. The new product goes into production once testing is complete.

SUMMARY

A system for the design of control systems for appliances, machines, machine tools, and the like improves a user's ability to develop a processor-based control system by reducing development cycles and eliminating or reducing the need for a formal customer requirement specification. The system is intended to reduce time to market, eliminate excess requirements cycles, lower system development costs, and improve overall product quality. Improvements in the product development cycle may be attained through the use of a computer-based virtual prototype tool, a state machine engine, standard embedded control code, a standard hardware platform, and real-time testing on actual appliance hardware for verification of the embedded control system.

In one general aspect, a control system for a device, such as an appliance, is generated by storing software representations of pre-existing control panel components and control processes on a computer and using the computer to develop a control panel and control software for the device by selecting and placing software representations of pre-existing control panel objects in a software representation of the control panel, selecting software representations of pre-existing control processes, and associating the selected control processes with the selected control panel objects. The control software then is downloaded from the computer to control hardware to be included in the device, and the device is tested using the control software running on the control hardware and under the control of the computer.

Embodiments may include one or more of the following features. For example, a virtual control panel generated at the computer may embody the control panel designed for the device. A user may manipulate the virtual control panel to generate virtual control inputs that then are transmitted to the control hardware to control the control hardware. The virtual control inputs may be transmitted using a communications protocol. The inputs may be transferred, for example, over a pair of wires, or through use of infrared or radio frequency transmission channels, and using any standard communications protocol.

When the control hardware includes a standard hardware control module for implementing the control software and having a communications interface, the standard hardware control module may be connected to the computer through the communications interface and to active components of the device prior to transmission. After the device is tested, copies of the standard hardware control module may be included in production versions of the device. The standard hardware control module may be selected from a set of predefined standard hardware control modules. Each standard hardware control module may be capable of running standard software and may have different performance characteristics, and selection of a standard hardware control module may be based on performance characteristics required by the control panel and the control software. Selection may be done automatically by the computer.

Software representations of active device components also may be stored on the computer. In this case, using the computer to develop the control panel and the control software for the device may include selecting one or more representations of active device components and associating the selected active device components with one or more selected control processes or selected control panel objects.

A standard control process may include, for example, a list of sequential control steps, a state machine, or a set of interrupts.

Using the computer to develop a control panel and control software for the device may include using graphical techniques to display the software representation of the control panel and to select and place software representations of the control panel components on the displayed software representation of the control panel. The software representations of control panel components may be displayed as icons, and a selected icon may be displayed as a three-dimensional representation of a corresponding control panel component.

The graphical techniques may involve use of a graphical drawing tool. The graphical drawing tool also may display icons representing the pre-existing control processes.

A computer-controlled modelling system may be used to generate a three-dimensional model of the control panel.

The control hardware may include standard control software. Downloading the control software from the computer to the control hardware may include adding one or more modules to the standard control software, or replacing one or more modules of that software.

The control software may be generated without generating a control panel. Such an approach may find use, for example, when it is desired to add functionality to a device or modify operation of the device without modifying the control panel of the device.

The control software also may be generated prior to generating a control panel. In this case, the computer may automatically generate a list of control panel components needed for a control panel of the device based on requirements of the control software.

The control panel also may be generated without also generating new control software. This may be useful, for example, when it is desired to provide a new control panel design without modifying the underlying functionality of a device.

In another general aspect, a design specification for a control panel for a device is generated. First, a computer is used to graphically generate a control panel for a device. Thereafter, the computer is used to automatically generate the design specification from the control panel. Using the computer to graphically generate the control panel for the device may include using one or more standard objects. A standard object may include a graphical representation of a physical embodiment of the object and a logical representation of operation of the object. Embodiments may include one or more of the features noted above.

In another general aspect a control system for a device may be designed by providing a collection of standard hardware control modules, each of which is capable of running standard software and has different performance characteristics. A computer may be used to develop a control panel and control software for the device, and one or more of the standard hardware control modules to be included in the device may be selected based on performance characteristics required by the control panel and control software. Thus, the hardware to be included is selected after the control software is generated so that optimal hardware for the software may be provided. Embodiments may include one or more of the features noted above.

The systems and techniques may be used to develop appliance control systems and will be described using that product as a reference. Appliances may include, for example, blenders, coffee makers, clock radios, clothes dryers, dish washers, food processors, microwave ovens, mixers, ovens, ranges, refrigerators, stereo equipment, televisions, video cassette or digital video disc recorders, and washing machines. It also should be understood that this invention can be used for development of any type of microprocessor-based control system.

The known product development process in the prior art takes from six to eighteen months and averages about twelve months. The intention of this invention is to reduce the new product development cycle from its current average of twelve months to less than six months. This will be accomplished by eliminating the need for a system requirements specification and a detailed design specification, or at least simplifying the creation of these specifications, and through re-use of pre-existing, pre-tested software components.

The techniques may be implemented in computer hardware or software, or a combination of the two. However, the techniques are not limited to any particular hardware or software configuration; they may find applicability in any computing or processing environment that may be used for control system design. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to the one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, EEPROM, hard disk or magnetic diskette) that is readable by a general or special purpose programmable computer or controller for configuring and operating the computer or controller when the storage medium or device is read by the computer or controller to perform the procedures described in this document. The system may also be considered to be implemented as a computer-readable storage medium, configured with a computer program, where the storage medium so configured causes a computer to operate in a specific and predefined manner.

Other features and advantages will be apparent from the following description, including the drawings and the claims.

DESCRIPTION OF DRAWINGS

FIG. 1 is a block diagram of a design system for controls.

FIG. 2 is a block diagram of an appliance.

FIGS. 6A–6G are block diagrams of standard hardware modules of the system of FIG. 1.

DETAILED DESCRIPTION

Figure 3:
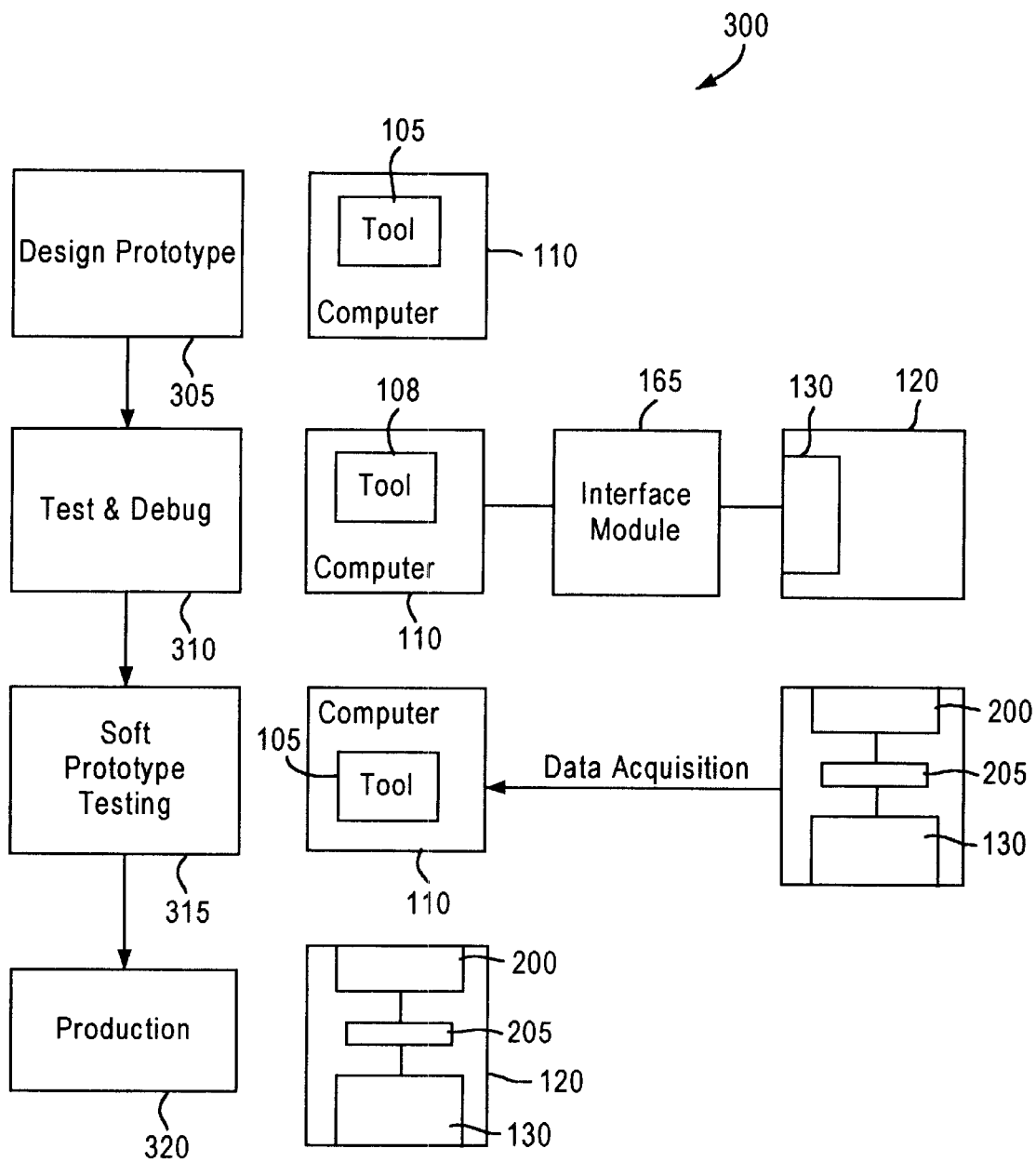
FIG. 3 is a flow chart of a procedure for producing an appliance using the system of FIG. 1.

Referring to FIG. 1, a design system 100 uses a design tool 105 running on a computer 110 along with a set of standard hardware control modules 115 to simplify design and development of controls for a device 120, such as an appliance, a machine, or a machine tool. Through the computer 110 and a communications link 125, the design tool 105 communicates with a standard hardware control module 115 that is connected to control active components 130 of a device 120.

Referring also to FIG. 2, an appliance or other device 120 typically includes active components 130, a control panel 200, and a controller 205 connected between the control panel 200 and the active components 130. The control panel 200 provides the interface between the appliance and the appliance operator. The controller 205 receives inputs from the control panel 200 and from sensors associated with the active components 130, and generates control signals that control the active components 130. The controller 205 also provides feedback to the control panel 200 for use in controlling indicators and displays on the control panel 200. With the system 100, the controller 205 is embodied in the standard hardware control module 115, and the tool 105 is used to design the control panel 200 and the software implemented by the hardware control module 115.

The design tool 105 provides a library 135 of standard control objects 140 that may be used by users to design and implement device control systems. The design system 100 promises to dramatically reduce development time, to eliminate the need to hold large inventories of controls for different models of a device, to permit cost-effective production of short-run, niche devices, and to allow upgrading of existing devices by simply reprogramming the controller. While the design system 100 may be used to design controls for a variety of different device types, the following discussion focuses on appliance controls.

The design system 100 permits engineers to reuse aspects of prior designs in designing a new product. To this end, the tool 105 provides a series of control objects 140 that may be used as provided, or modified as desired. For example, a typical control for starting a gas oven includes this sequence of events: open the gas valve, ignite the flame, bring the oven cavity temperature to a desired value, and maintain that temperature until instructed otherwise. The control for an automatic washing machine, when washing cotton fabric, might include this sequence of events: fill the tub to a desired level, heat the wash water to a desired temperature, agitate for a designated number of minutes, drain the tub, spin for a designated number of minutes, then shut off. Each of these sequences of steps is stored as a control object 140 in the library 135. The library 135 of control objects 140 provides common control elements (e.g., buttons, switches, knobs, and indicators) and software interfaces (e.g., oven or washer initiation sequences) between those control elements and appliance components.

In general, a standard hardware control module includes a processor 145, RAM 150, flash memory 155, and interface hardware 160. During design, development, and testing, a standard hardware control module 115 is connected to the device 120 to control active components 130 of the device. During production, the standard hardware control module is installed in the device. Use of the same hardware for development, testing, and production serves to eliminate, or at least substantially reduce, post-production operational problems.

After the control panel and the control software are designed using the tool 105, the control software is linked. The linked software may include previously-tested modules, as well as new modules generated for the particular control panel. The linked software then is downloaded to the flash memory 155 of the module 115. Downloading the linked software may involve replacing the entire contents of the flash memory 155, or may involve merely replacing one or more modules of a previously-loaded (and previously-tested) system. Thereafter, the module 115 may be operated to control the device 120. Prior to production, the module 115 may be operated using inputs from a simulated control panel implemented by the tool 105. After production, the module 115 is operated under control of an actual control panel 200. Through use of flash memory, the software can be updated at a later date to correct problems or to provide enhanced functionality.

The software-based design approach also permits development of niche products. An example of such a product is a microwave oven with symbols and controls geared to the specific needs of children or the elderly. Another example is an appliance that accounts for factors such as the altitude, water hardness, or climate of a region to which the appliance is to be shipped. The appliance owner also can account for these factors by reprogramming the control module upon moving the appliance between regions having substantially different conditions. This reprogramming may be provided over the telephone or over the Internet. To this end, the appliance may include a port that permits a connection to the owner's computer or a direct telephone or internet connection. The Internet or a telephone connection also may be used to provide problem diagnosis or repair.

Referring also to FIG. 3, product development using the system 100 proceeds according to a four phase process 300. Initially, a prototype is designed using only the design tool 105 and the computer 110 (step 305). Next, the prototype is tested and debugged using an interface module 165 connected between the computer 110 and the active components 130 of the appliance (step 310). Essentially, the interface module is a single hardware device that implements all variations of the set of standard hardware control modules 115. Use of the interface module permits the prototype to be designed without selecting the particular hardware control module to be used in the appliance. This allows selection of the optimal control module 115 after the design is complete. The tool 105 provides a virtual control panel that is displayed on a display 170 of the computer and permits the computer 110 to operate the interface module, which, in turn, operates the active components 130 of the appliance.

Once the design is debugged and the desired hardware control module 115 is selected, the hardware control module and the hardware control panel are installed in the appliance and further testing is performed (step 315). During this phase of the process, the computer 110 is used to acquire data from the appliance for analysis of the design. Finally, once all testing is complete, the appliance is ready for production (step 320).

Design Tool 105

Figure 4:
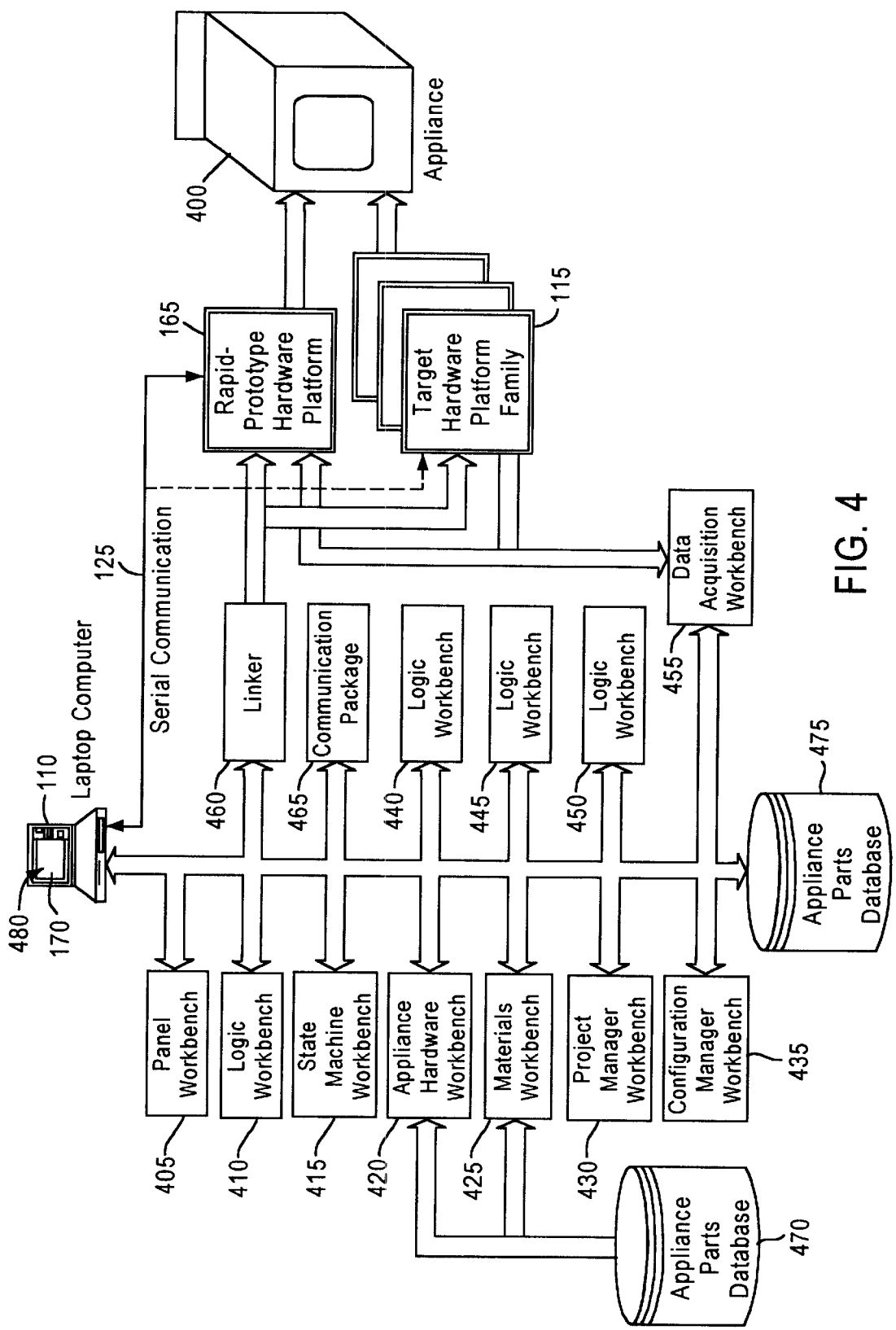
FIG. 4 is a block diagram showing details of a tool of the system of FIG. 1.

Referring to FIG. 4, the design tool 105 may be used to design processor-based control systems, such as may be used in an appliance 400. Major components of the tool 105 include a panel building workbench 405, a logic workbench 410, a state machine workbench 415, an appliance hardware workbench 420, a materials workbench 425, a project management workbench 430, a configuration manager workbench 435, a specification workbench 440, a molding workbench 445, a test workbench 450, a data acquisition workbench 455, a linker 460, a communications package 465, an appliance parts database 470, an appliance control database 475, and a virtual panel 480. Each component of the tool 105 performs a specific function and works interactively with the other components of the tool 105.

The tool 105 and its components are implemented by the computer 110, the display 170 of which may be used to display the virtual panel 480 and user interfaces of other system components. In one implementation, the computer is a conventional personal computer having an Intel Pentium processor, or the equivalent, and running Windows NT or a comparable operating system. The computer also includes sufficient memory, storage, I/O, processor speed, and peripherals to accomplish the designated functions. The computer also may be implemented using a laptop or notebook computer. The tool 105 communicates with the interface module 165, which is also referred to as the rapid-prototyping hardware platform, or with a standard hardware control module 115, which is also referred to as the target hardware platform, through the communications link 125.

Panel Building Workbench 405

Figure 5:
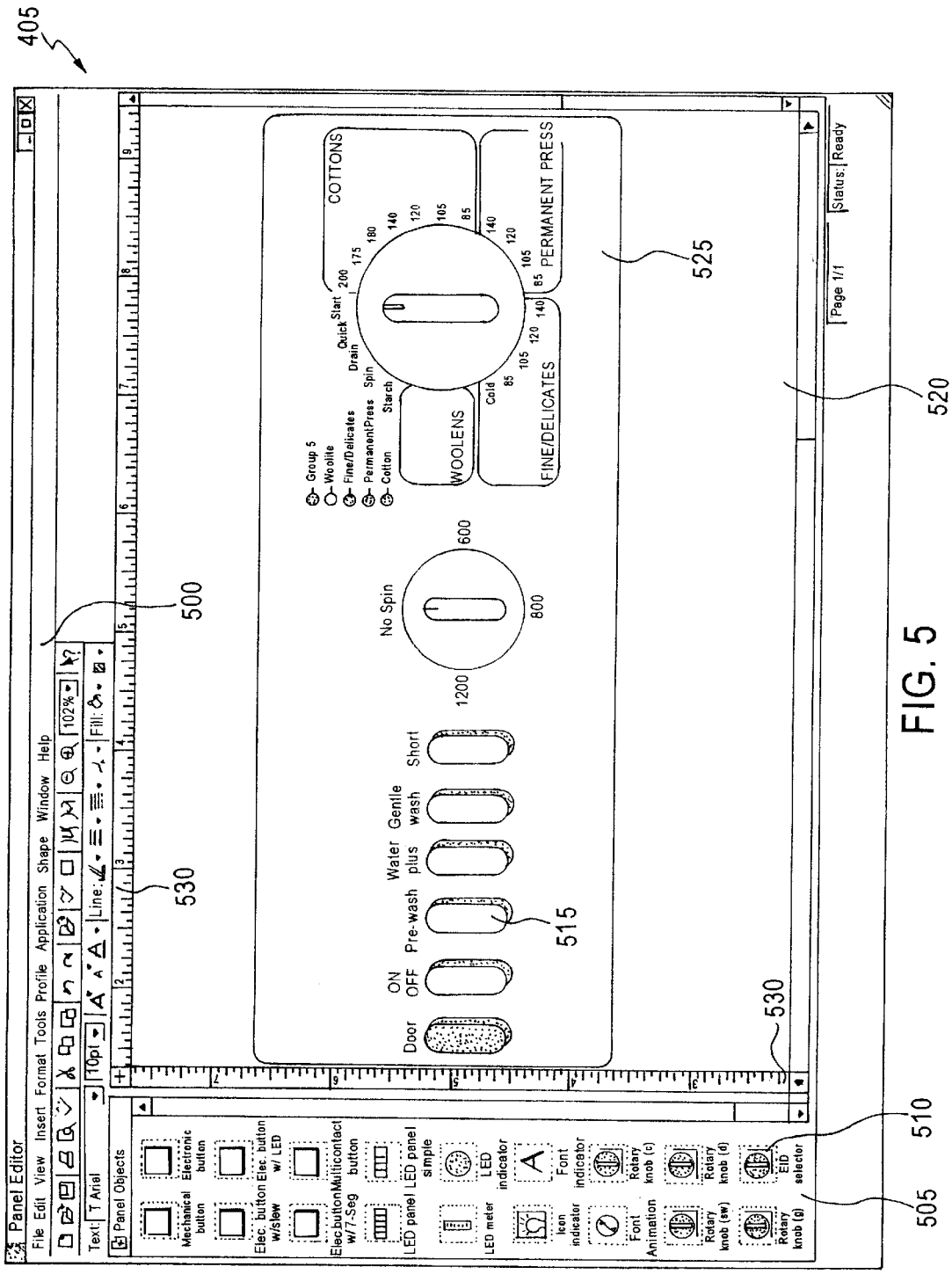
FIG. 5 is a representation of a user screen showing a replication of an appliance panel under design.
Figure 6A:
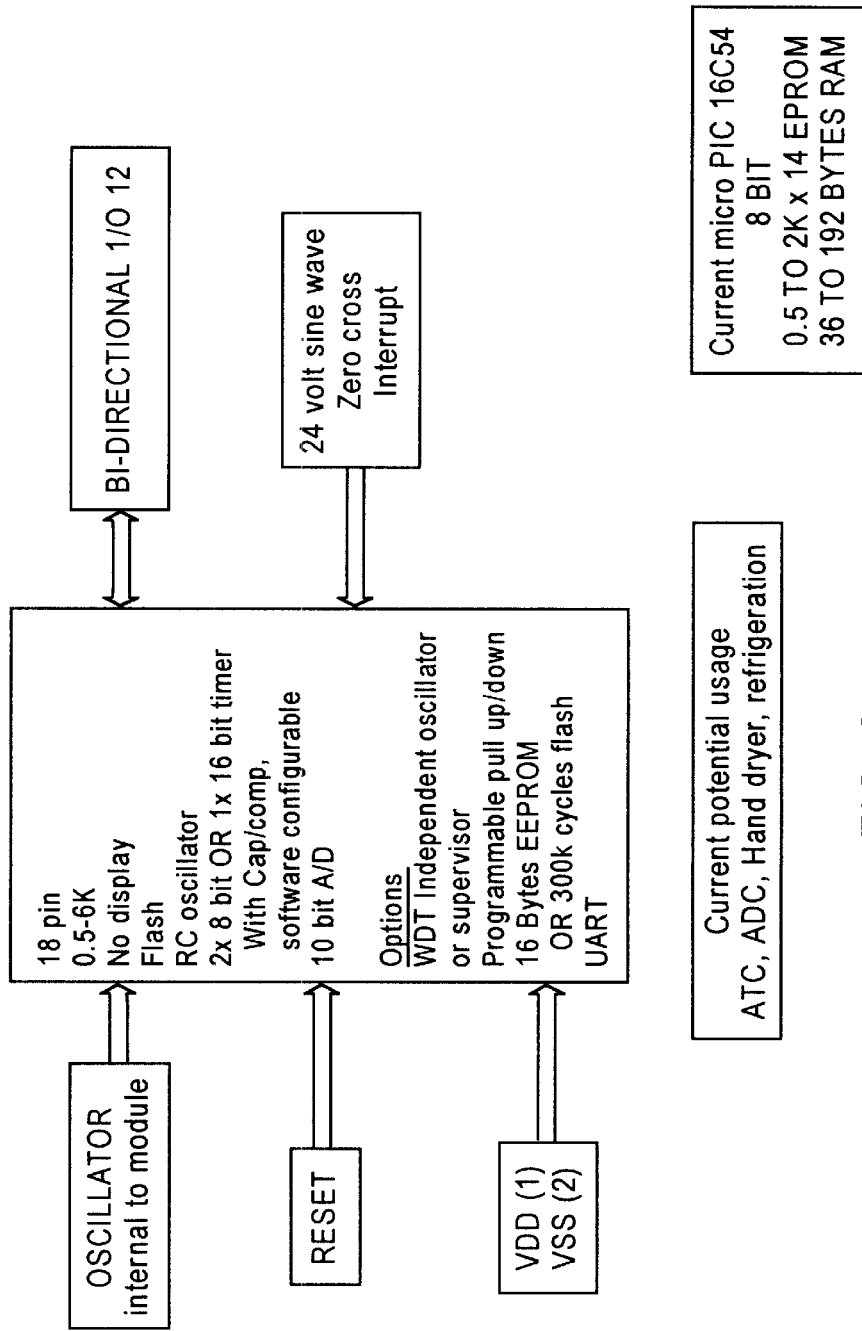
Figure 6C:
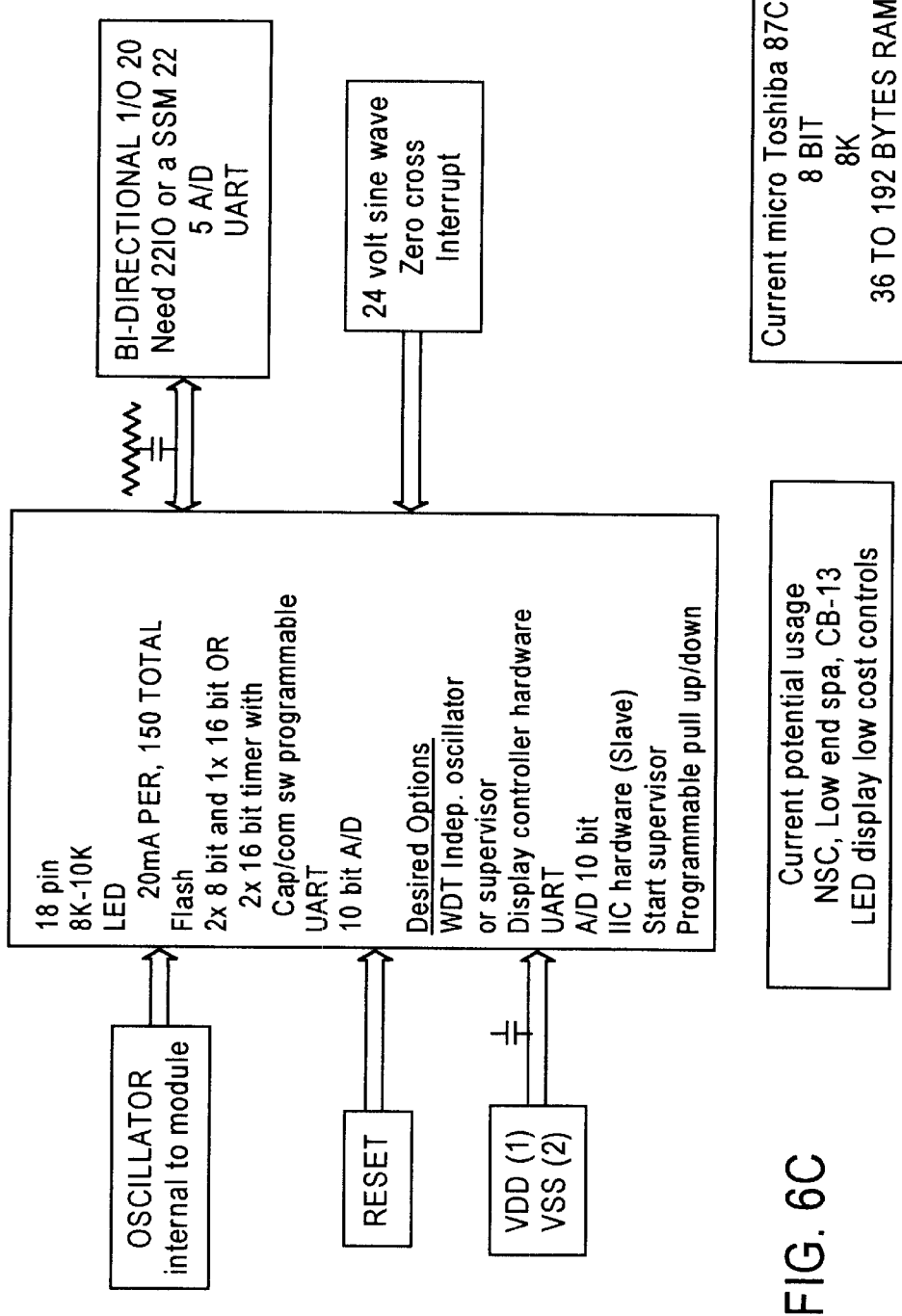
Figure 6D:
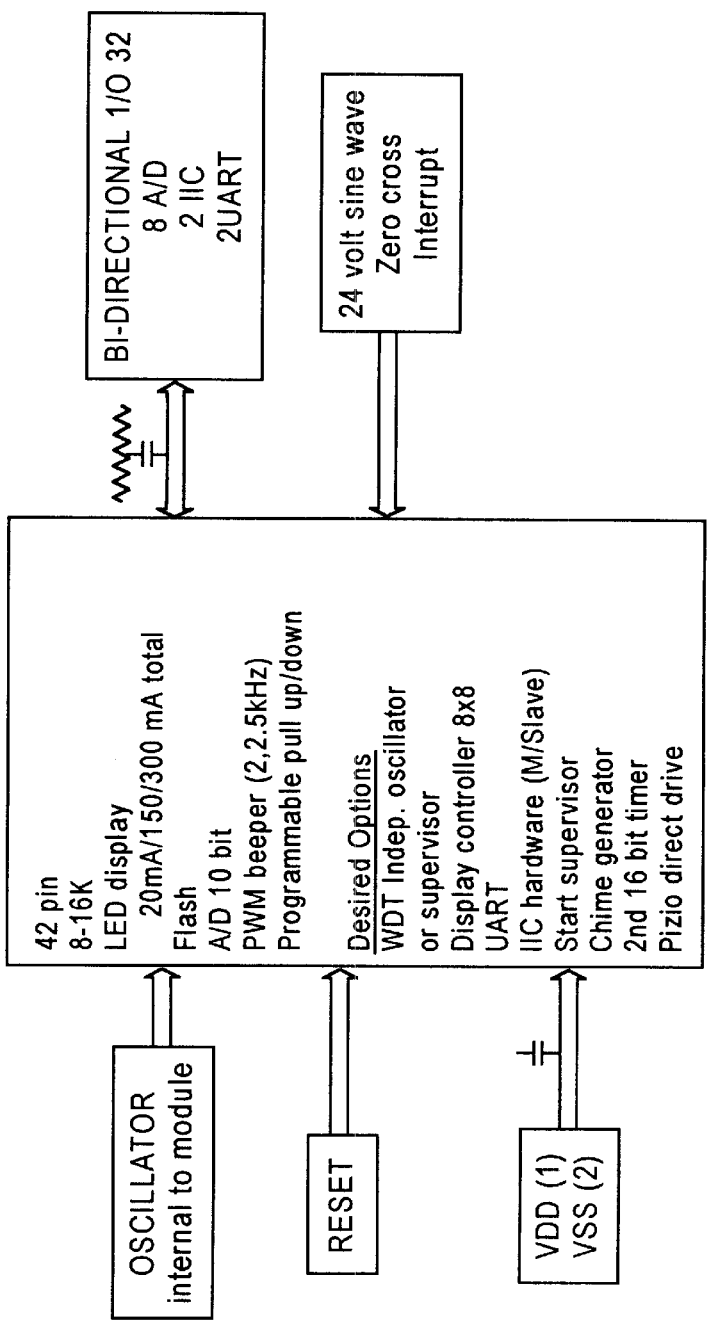
Figure 6E:
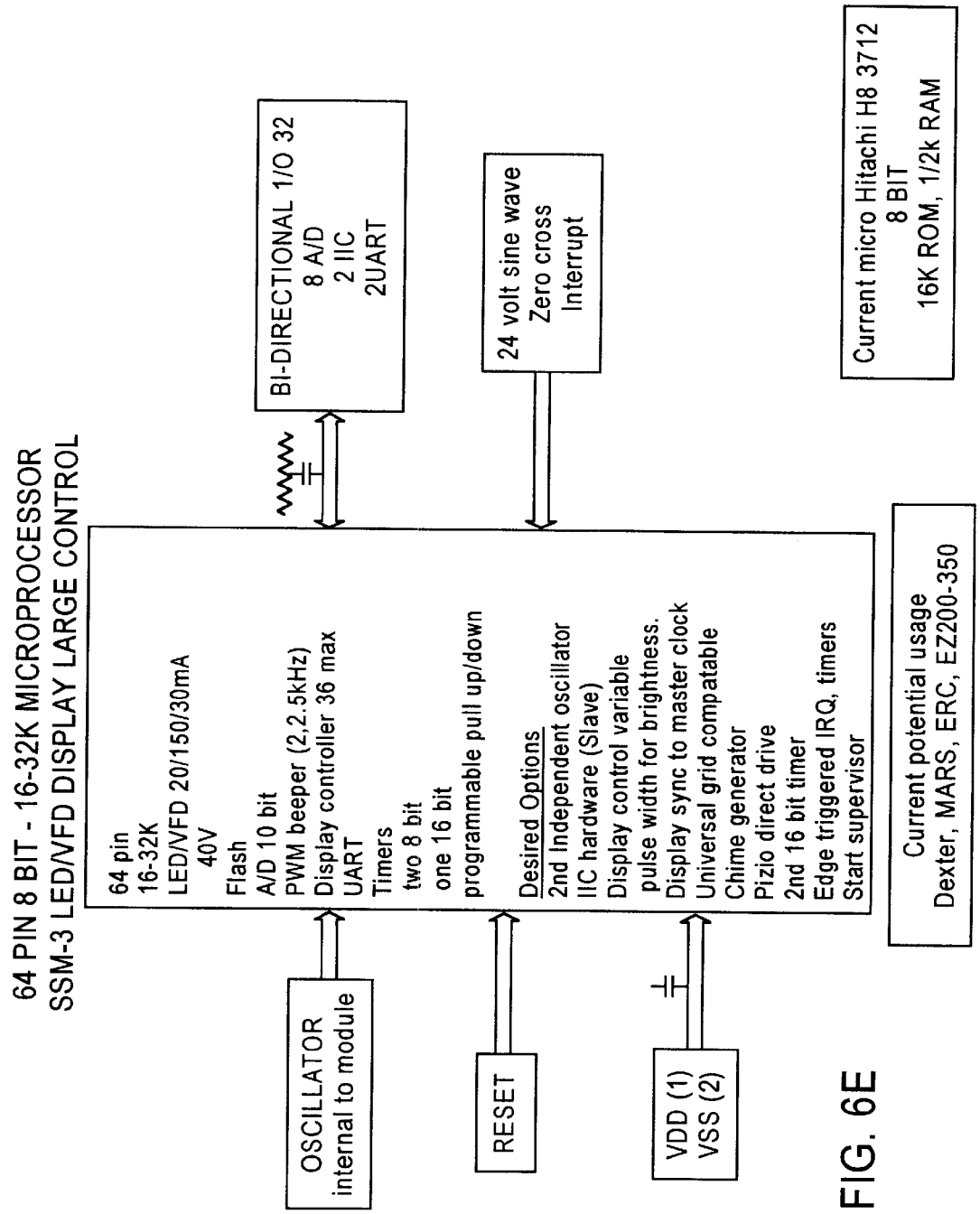
Figure 6F:
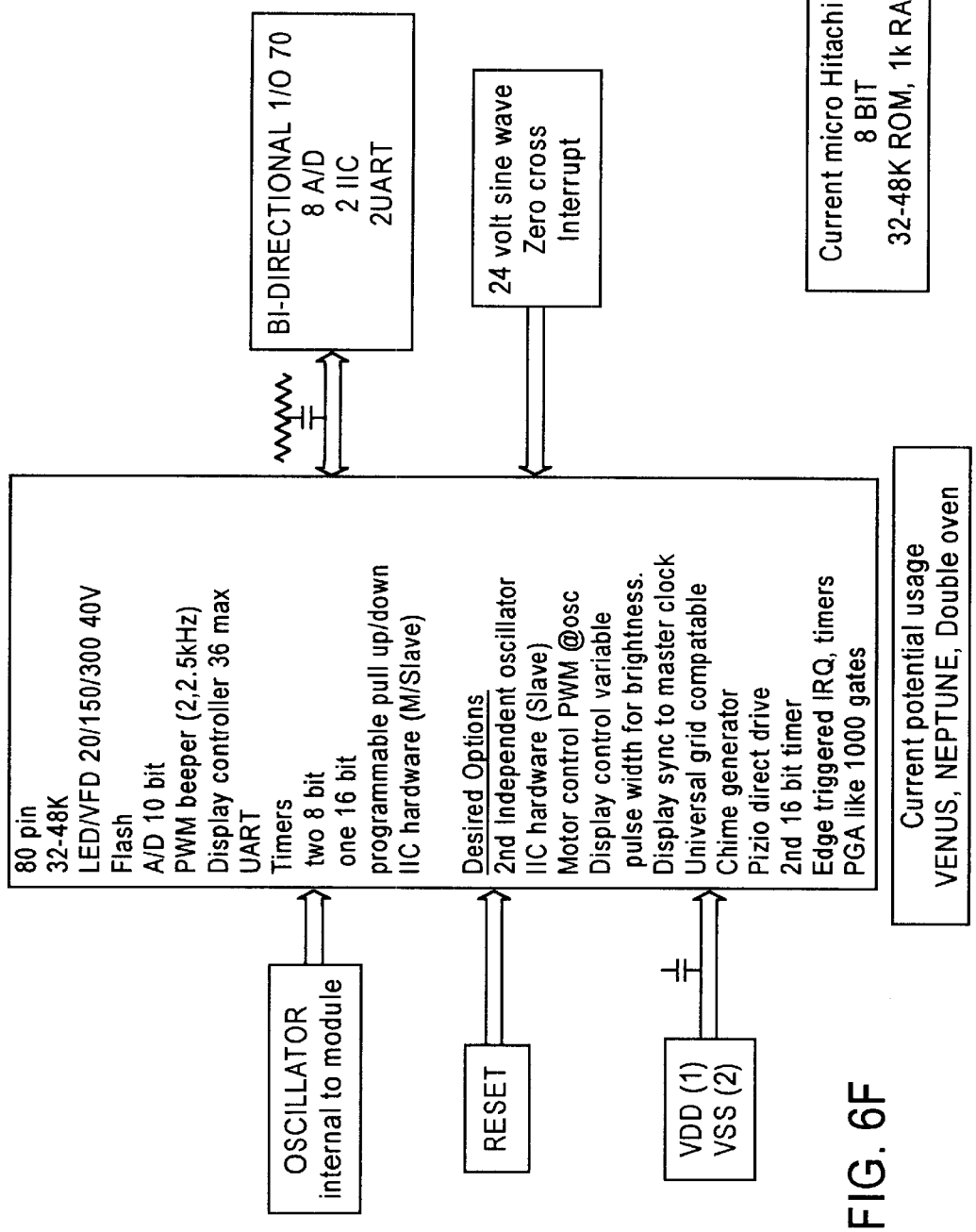
Figure 6G:
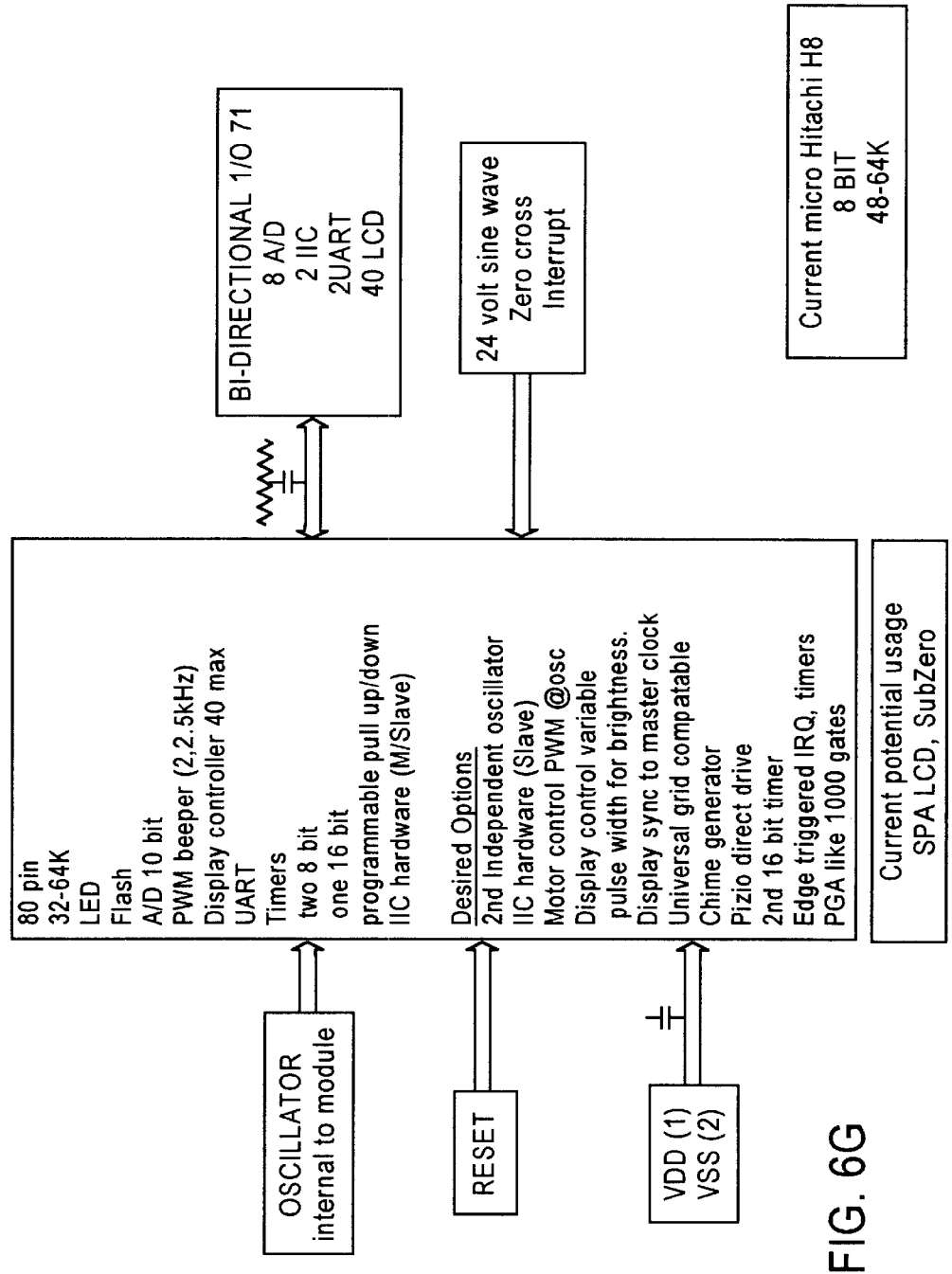

The panel building workbench 405 is a graphical drawing tool. Referring also to FIG. 5, the user screen 500 is split vertically into two specific areas. The left side 505 of the screen (one-fourth of the screen) is populated with icons 510 that may be used to select three-dimensioned photorealistic representations 515 of standard hardware objects (e.g., buttons, knobs, dials, displays). The right side 520 of the screen (three-fourths of the screen) is defined as a work area where the user designs a new control panel 525 that serves as the interface for the control system. The panel building workbench may be implemented using, for example, Visio graphics software available from Visio Corporation.

The characteristics of each icon 510 (e.g., size, shape, electrical connection, voltage requirements, and state logic description) are predefined and stored in the appliance control database 475. When the user selects an icon 510 and moves the representation 515 to the work area 520, the tool 105 retrieves the characteristics of the icon from the appliance control database 475 and deposits data related to the characteristics into other workbenches. For example, electrical connection, voltage requirements and state logical characteristics are sent to the logic workbench 410. Similarly, the part number, vendor data, cost and lead time are sent to the project management workbench 430 and the materials workbench 425.

The design process starts with the user defining the overall size and shape of the control panel 525. To this end, the work area 520 includes vertical and horizontal rulers 530. Next, the user places object representations 515 onto the control panel 525 by using a mouse or other pointer device of the computer to select an appropriate icon 510 and to drag the representation 515 into the work area 520. The user can modify, for example, the location on the control panel, the size, the shape, the color, and the text for each representation 515 that is moved into the work area 520. When the panel design is complete, the user saves the drawing to a file for future reference.

One advantage of this system is that the user designs the panel and sees the actual panel as built. By contrast, traditional design approaches require a designer to write a specification that then is interpreted by other designers who produce a panel according to their interpretation of the specification.

Logic Workbench 410

The logic workbench 410 allows the user to create the desired control logic for the appliance 400. As noted above, the logic workbench 410 is automatically populated with standard component characteristics as the control panel 525 is generated. The logic workbench 410 permits the user to edit these standard characteristics to establish the desired control logic. After all editing is complete, the user can send the final control logic to the linker 460 for linking, which may be followed by downloading using the communications package 465 and testing using the test workbench 450.

State Machine Workbench 415

The state machine workbench 415 allows the user to build and maintain one or more libraries of predefined components. These components describe the elementary control functions of the hardware devices used in the development of device functionality. The state machine workbench allows the user to define the states of operation of the device and to link any of the components to any of these states to further define the function of the device in each state. The user can further define the logical process of transition through the various states of operation of the device. The states and their transition logic are stored in the appliance control database 475.

Appliance Hardware Workbench 420

The hardware workbench 420 allows the user to create and maintain database 470 and 475 of information associated with the parts that are used to build the appliance control panels. Data is retrieved from the appliance parts database 470, manipulated by the user, and stored into the appliance control database 475. The appliance parts database 470 can be maintained by the user, or by the user's customer. For example, a customer's purchasing department may maintain its own appliance parts database 470. These databases may be shared, if desired and authorized. The parts information retrieved from the appliance parts database 470 may include, for example, part number, vendor data, price and lead-time information. All of the data is inserted into database records and stored in the appropriate appliance control database 475. As shown in FIG. 4, all workbench tools have access to the appliance control database 475, while access to the appliance parts database 470 is limited.

Materials Workbench 425

The materials workbench 425 automatically creates a bill of materials for the new control panel that is developed in the panel workbench 405. The materials workbench 425 acquires input from the panel building workbench 405 and, based on the devices selected, accesses the appliance parts database 470 and the appliance control database 475 to acquire part numbers, vendor identification, price, and parts delivery lead time. The materials workbench outputs this data to a file that can be accessed by the user.

Project Management Workbench 430

The project management workbench 430 automatically generates a project schedule that includes a task list, duration, milestones, staffing requirements, and one or more proposed budgets. This workbench receives input from the panel building workbench 405, the materials workbench 425, and the appliance control database 475 to determine time and cost estimates based on the parts selected. The project management workbench generates a schedule and illustrates the schedule in a selected chart format. The user can then edit and save the schedule for future reference.

Configuration Manager Workbench 435

The configuration manager workbench 435 permits the user to define the operational parameters for the system. The user has the ability to define parameters for the hardware, communications, system administration functions, and any other required configuration parameters.

Specification Workbench 440

The specification workbench 440 automatically generates a detailed design specification document for the new control board or panel. The workbench 440 receives inputs from the panel building workbench 405, the logic workbench 410, the state machine workbench 415, the materials workbench 425, the configuration manager workbench 435, and the appliance control database 475. The output of this workbench may be, for example, a text file that can be edited in a conventional word processing package.

Molding Workbench 445

The molding workbench 445 receives input from the panel building workbench 405. In one implementation, this input is in the form of a CAD drawing file of the new appliance control panel. The molding workbench 445 can output this CAD drawing file to any of several available plastic modeling tools to produce a physical, three-dimensional model of the control panel. This physical model then can be used to verify form and fit of the prototype control panel in a cavity of the appliance 400 intended for the production control panel. This feature vastly improves the development cycle by producing a three-dimensional plastic model within a very short time. For example, the prototype can be available in one to two weeks, which allows for modifications in both the control panel and appliance designs at a very early, economical stage of development.

Test Workbench 450

The test workbench 450 includes a library of standard test scripts used to perform various tests on appliances. Examples include regression and acceptance tests. The user can select predefined tests from the standard library to run against the newly-developed control panel. The test workbench 450 also may include a test creation tool that assists the user in creating and modifying specific tests that can be saved in the standard library. A benefit of using standard test scripts is a significant time reduction in the testing cycle. Another benefit is ease of modifying old tests and developing new tests.

Data Acquisition Workbench 455

The data acquisition workbench 455 monitors performance parameters of the hardware in the interface module 165 or the standard hardware control module 115. This workbench uses the virtual panel 480 and the communications package 465 to acquire data from the hardware module.

The workbench permits the user to select the data to be monitored, and to start and stop operation in the data acquisition mode. Once the appliance is configured for data acquisition, performance parameters are communicated from the appliance hardware to the virtual panel 480. This communication may occur at predefined time intervals. The data collected can be displayed online and logged to a file for future analysis and verification. Tests run on the appliance hardware can be created by the user or selected from the test workbench 450.

Linker 460

The linker 460 converts all of the code generated by the logic workbench 410, the state machine workbench 415, and the configuration manager workbench 435 into a predefined binary format recognized by software embedded in the interface module 165 or the hardware module 115.

Communications Package 465

The communications package 465 is a messaging system that allows the virtual panel 480 to communicate with the interface module 165 or the hardware module 115. The messages transmitted between the virtual panel and the module are predefined and allow operation of the appliance 400 to be controlled from the computer. In particular, the user can run the virtual panel 480 on the computer to control and monitor the operation of the appliance in real-time. The running appliance can send update messages to the computer to update the virtual panel 480.

The communications package may be used to communicate with multiple appliances at the same time, through a single port or multiple ports. For example, multiple appliances can be controlled simultaneously using one or more virtual panels running on a single computer.

Appliance Parts Database 470

The appliance parts database 470 may be implemented as a relational database that contains information on all of the parts used to build appliance control boards/panels. Companies that build control boards normally maintain an appliance parts database 470. The tool 105 can communicate with any open database compliant (ODBC) system, or the equivalent, for data retrieval. Data from the appliance parts database are used as inputs to the appliance hardware workbench 420 and the materials workbench 425.

Appliance Control Database 475

The appliance control database 475 may be implemented as a relational database containing information for each of the parts that are used to build control boards. Detailed information for each part includes, for example, size, shape, color, electrical characteristics, state logic, and any other information required by any workbench.

Virtual Panel 480

The virtual panel 480 allows the user to control and monitor a running appliance from the computer. The control panel designated with the panel building workbench 405 is used as an active display to mimic the actual appliance control panel. The virtual panel 480 uses the communications packages to send commands to the standard hardware platform 115 and receive updates from the hardware. The user can start, stop, and change the position of controls such as buttons, switches, and knobs on the virtual panel, and have these actions communicated to the appliance hardware. Any changes in the appliance hardware display are communicated to the virtual panel 480 as update messages to the panel.

Standard Hardware Control Modules 115

The standard hardware control modules 115 provide a scalable approach to hardware definition. They allow the user to select a hardware platform based on criteria such as input/output pin counts, RAM size, ROM size, display requirements (LED, VFD, LCD), and desired power requirements. The hardware may be selected from a standard family of microprocessors or controllers based on design requirements. Each microprocessor or controller in the family is capable of running standard embedded software that may be configured per appliance. For example, one implementation uses seven different types of standard hardware modules, with the modules differing based on their pin counts (ranging from 13 pins for the simplest module to 80 pins for the most complex module) and performance characteristics. FIGS. 6A–6G illustrate characteristics of the seven types of hardware modules.

Interface Module 165

In essence, the interface module 165 is one or more modules including all permitted variations of the standard control modules 115. Since the interface module supports all of the variations, it provides a useful, efficient mechanism for testing those variations. Furthermore, it permits the user to delay selection of the particular control module to be used until the design is complete. This permits the user to select the control module that is optimal for the final design.

Product Development Using the System

Figure 7:
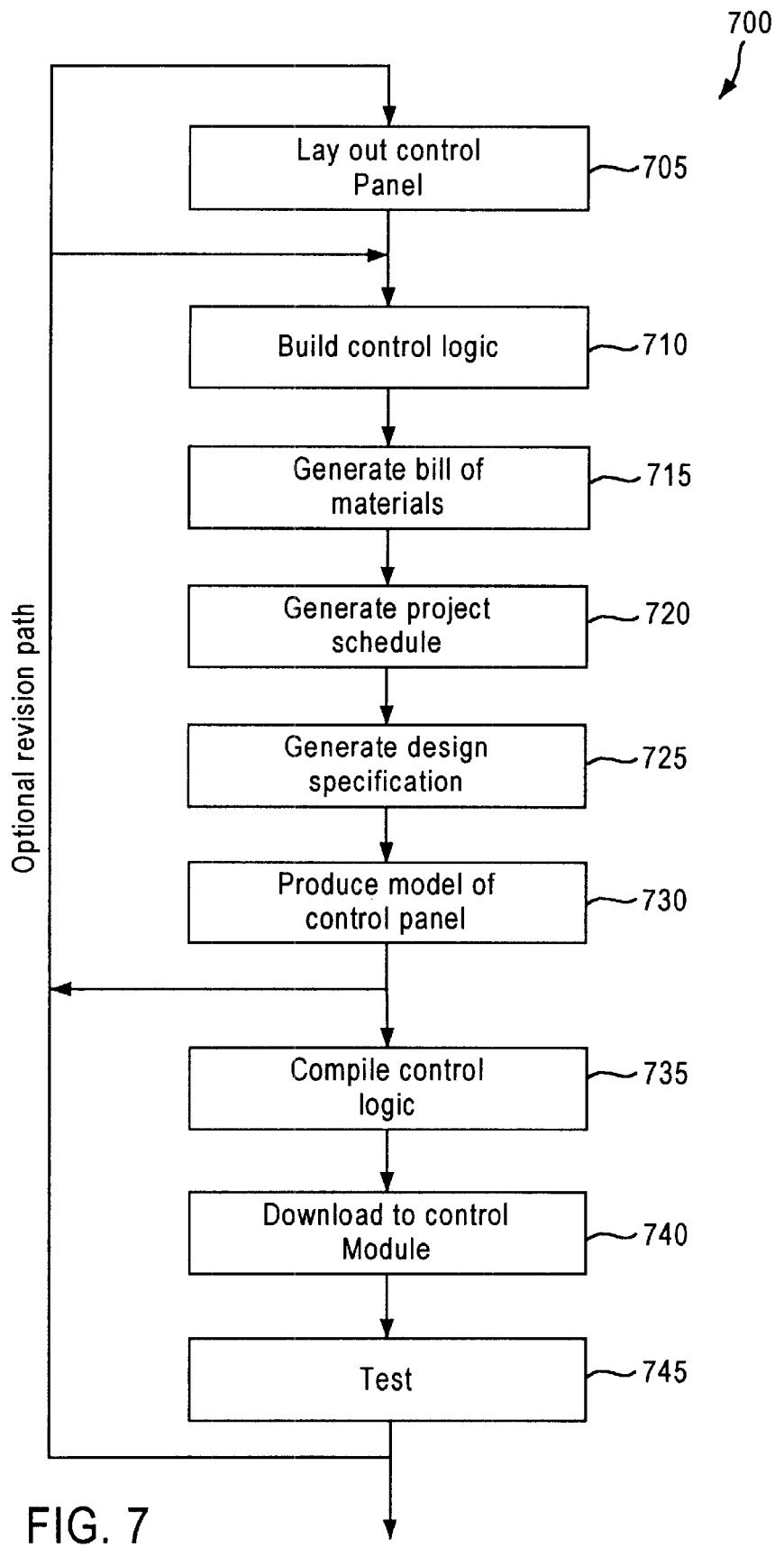
FIG. 7 is a flow chart of a procedure for producing a control system using the system of FIG. 1.

FIG. 7 illustrates one implementation of the product development process 700 using the tool 105. Initially, a user lays out the appliance control panel using the panel building workbench 405 (step 705). As noted above, the panel building workbench uses the appliance control database 475 and automatically sends information about the panel design to other workbenches, such as the logic workbench 410, the project management workbench 430, and the materials workbench 430.

Once the control panel design is complete, the user builds the control logic for the panel using the logic workbench 410 and the state machine workbench 415 (step 710). This process uses standard control objects from the appliance control database 475, which speeds the development process significantly. As noted above, control objects embodied in the elements of the panel are provided automatically to the logic workbench 410 by the panel building workbench 405.

The materials workbench 430 then automatically generates a bill of materials (step 715) using information from the panel building workbench 405, the logic workbench 410, and the parts database 470. Similarly, the project management workbench automatically generates a project schedule (step 720), and the specification workbench 440 automatically generates a detailed design specification (step 725).

At this time, the user may use the molding workbench 445 to produce a plastic model of the control panel (step 730). If necessary, the control panel design then may be further refined (step 705).

Next, the linker 460 links the control logic (step 735). The communications package 465 then downloads the linked control logic to the interface module 165 or the control module 115 (step 740), which is connected to the appliance 400 to be controlled.

Using the data acquisition workbench 455, the virtual panel 480, and the test workbench 450, the user then tests the control panel design (step 745) on the actual hardware to be included in the appliance. This offers considerable advantages over merely simulating operation of the control panel. If necessary, refinements may be made to the control panel design (step 705) or the control logic (step 710) in response to the test results.

System Object Model

Figure 8:
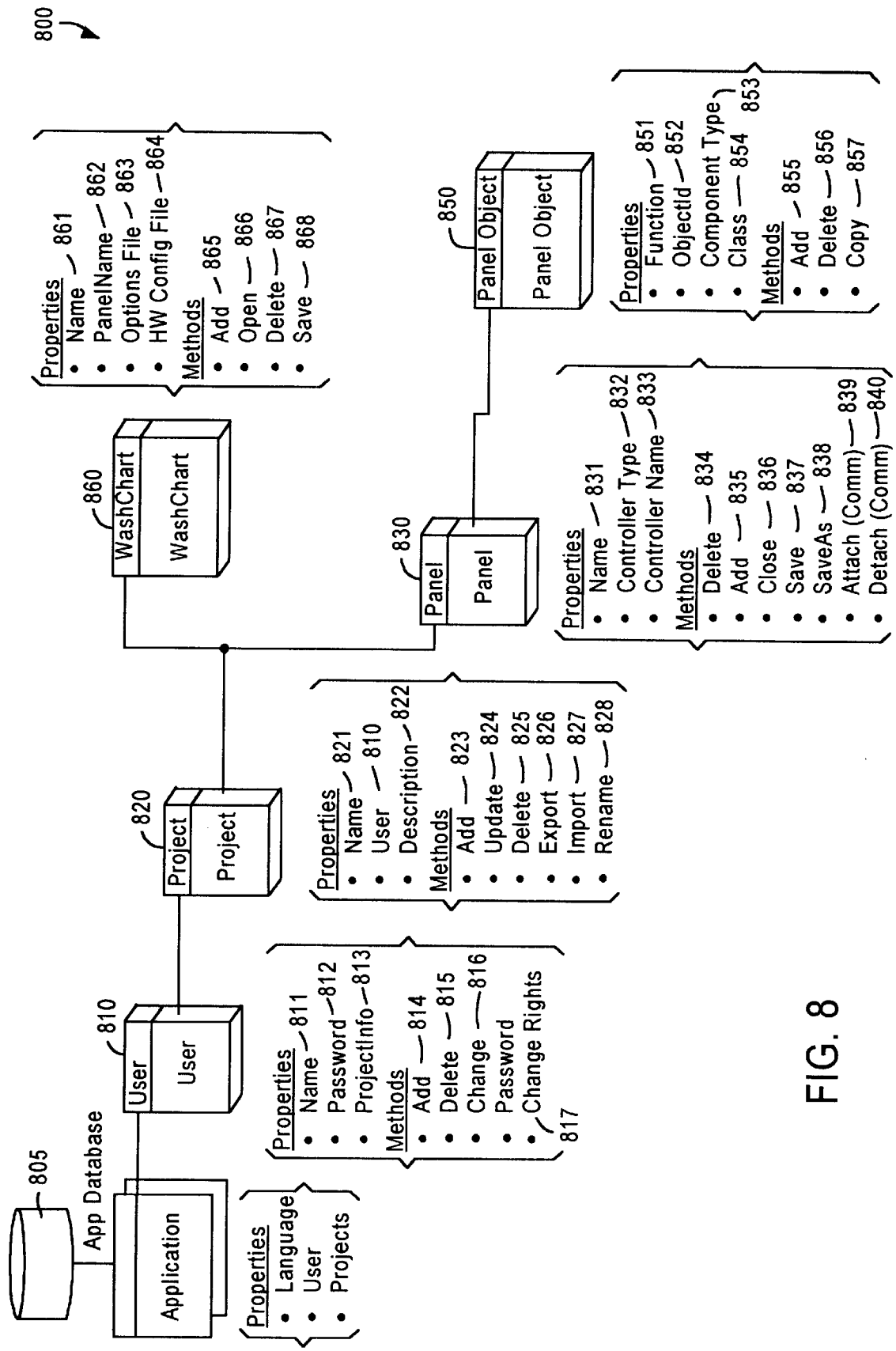
FIG. 8 is a block diagram of an object model used by the system of FIG. 1.

Referring to FIG. 8, the system 100 maintains control system designs using an object model 800. The designs are stored in an application database 805 that is subdivided by users 810. Properties associated with a user include a user name 811, a password 812, and project information 813. Functions associated with a user include adding a user (814), deleting a user (815), changing the user's password (816), and changing the user's rights (817).

A set of one or more projects 820 is associated with each user 810. Properties of a project include the project name 821, the associated user 810, and a description 822 of the project. Functions associated with projects include adding a project (823), updating a project (824), deleting a project (825), exporting a project (826), importing a project (827), and renaming a project (828).

A set of one or more control panels 830 is associated with each project 820. Properties of a control panel includes the name 831, the controller type 832, and the controller name 833 for the control panel. Functions associated with control panels include deleting a control panel (834), adding a control panel (835), closing a control panel (836), saving a control panel (837), saving a control panel under a different name (838), attaching a control panel to the communications link (839), and detaching the control panel from the communications link (840).

One or more panel objects 850 are associated with each control panel 830. Properties of a panel object include the function 851 of the object, the name 852 (objectid) of the object, the component type 853 of the object, and the class 854 of the object. Functions associated with objects include adding an object (855), deleting an object (856), and copying an object (857).

Control logic also is associated with each project. For example, when a project implements a washing machine, the control logic is represented by a wash chart object 860. Properties of a wash chart object 860 include the name 861 of the wash chart, the name 862 of the control panel associated with the wash chart, the options file 863 associated with the wash chart, and the hardware configuration file 864 associated with the wash chart. Functions associated with wash charts include adding a wash chart (865), opening a wash chart (866), deleting a wash chart (867), and saving a wash chart (868).

System Operation Example

System operation now will be described with respect to the example of designing a control panel for a washing machine, using screen displays of an implementation of the tool 105. The implementation is a Windows-based application that provides an interface having the same look and feel as well known programs, such as Microsoft Word or Microsoft Excel.

Figure 9:
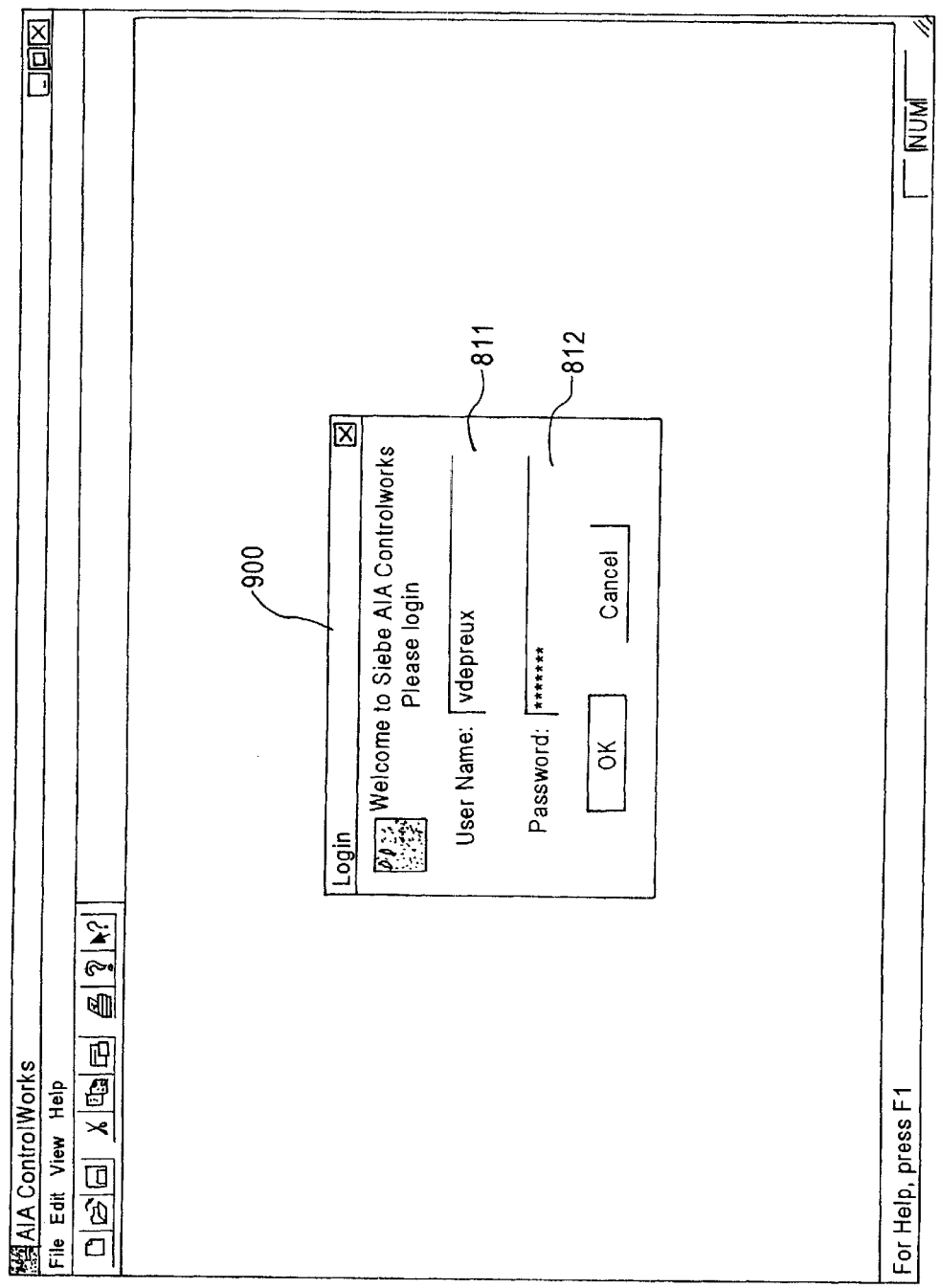
FIGS. 9–17 are screen displays of the system of FIG. 1.

Referring to FIG. 9, upon system initiation, a login dialog 900 requires a user to log into the system by typing a user name 811 and a password 812. This login requirement serves to protect proprietary design information, such as appliance behavior models, from unauthorized access.

Figure 10:
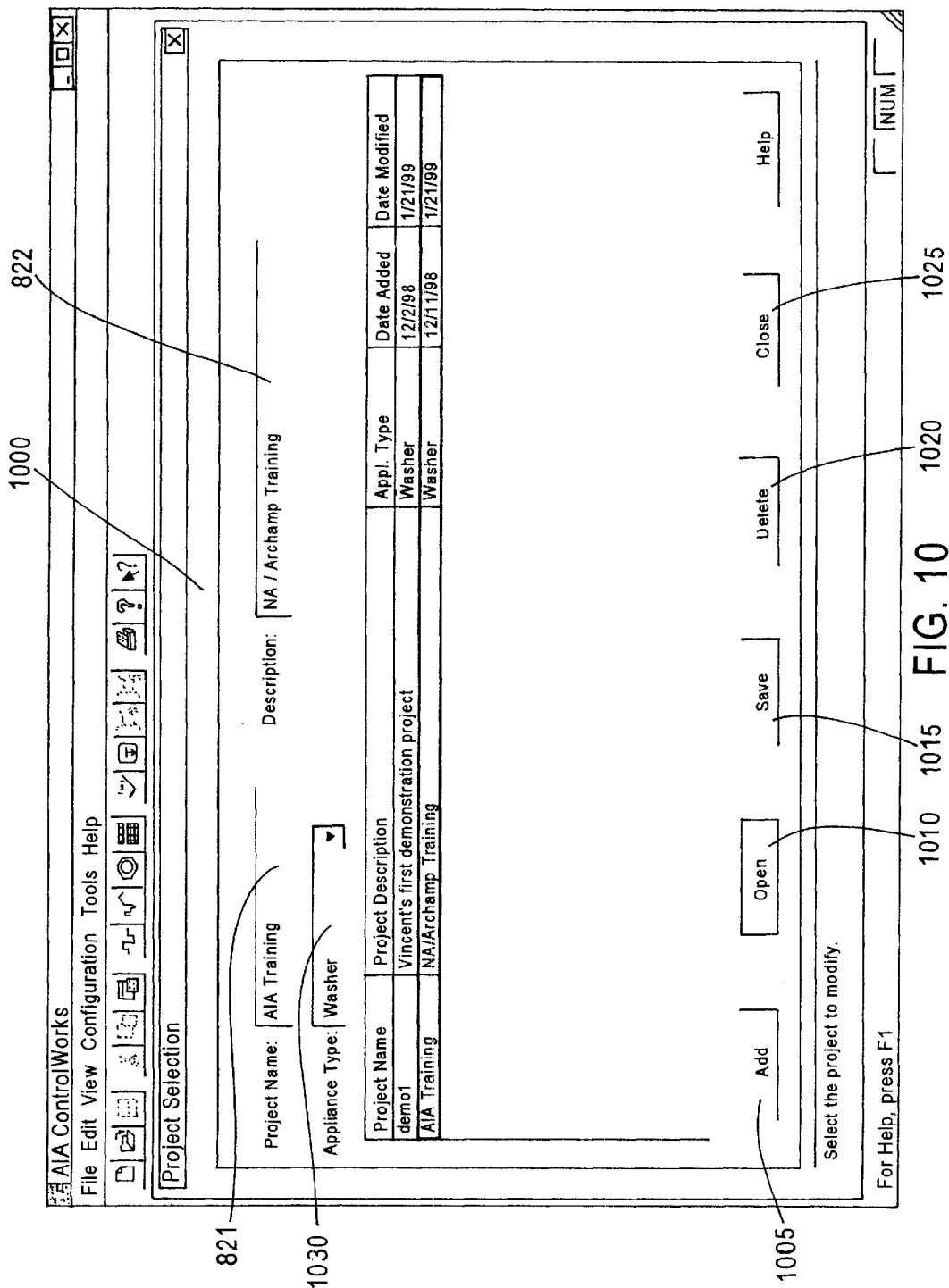

Referring to FIG. 10, once the user logs into the system, a project selection dialog 1000 is presented. The project selection dialog permits the user to select a project 820 on which to work. An Add button 1005, an Open button 1010, a Save button 1015, a Delete button 1020, and a Close button 1025 permit the user to operate on the list of projects. For example, the user can use the Add button 1005 to add a new project. Projects may be set up on a client basis, with all projects associated with a particular client stored together. Alternatively, projects may be defined on a project-by-project basis with, for example, multiple versions of a derivative project grouped together.

For each project, the user must specify the project name 821 and may enter a project description 822. The user also must select an appliance type 1030 from a list of supported appliance types. Examples of supported appliance types include Washer, Dryer, Washer/Dryer, Cooking, and Dishwasher.

Figure 11:
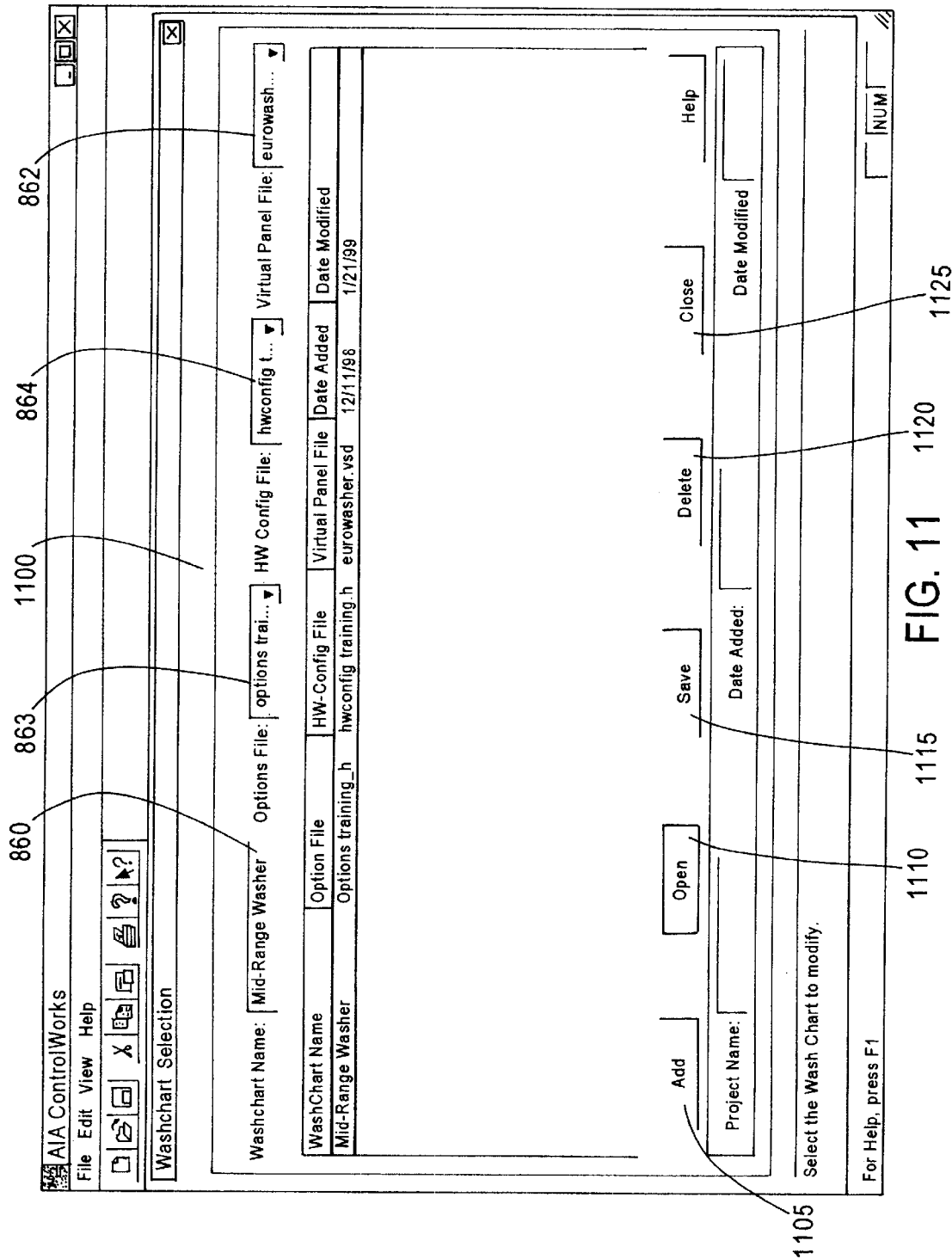

The appliance type 1030 for the project controls which other dialogs are presented to the user. For example, if an appliance type of Washer is selected, a wash chart selection dialog 1100, such as is shown in FIG. 11, is presented to the user. The wash chart selection dialog 1100 is similar to the project selection dialog 1000, and allows user management of all wash charts 860 that may be associated with a project. The wash chart selection dialog 1100 provides an Add button 1105, an Open button 1110, a Save button 1115, a Delete button 1120, and a Close button 1125 that permit the user to perform the corresponding functions.

Three files are associated with each wash chart 860: an options file 863 that defines user interface options, a hardware configuration file 864 that defines the hardware configuration, and an appliance control panel file 862 that specifies an appliance control panel associated with the wash chart 860. Use of these separate files permits the wash chart to be designed independently of hardware specific data for use across multiple products.

Upon selecting a wash chart 860, the user is permitted to edit the associated control panel using the panel building workbench 405, or to edit the associated control logic using the logic workbench 410 and state machine workbench 415. Selection of the panel building workbench 405 is illustrated in FIG. 5 and discussed above. Each panel element may be customized as desired by the user. Properties that may be modified include the shape and color of the element, whether the element is three-dimensional or provides a flat panel appearance, whether there is an indicator on or near the element, and the color of that indicator. In addition, text or icons associated with an element may be positioned as desired, and may be in any desired color or font.

Figure 12:
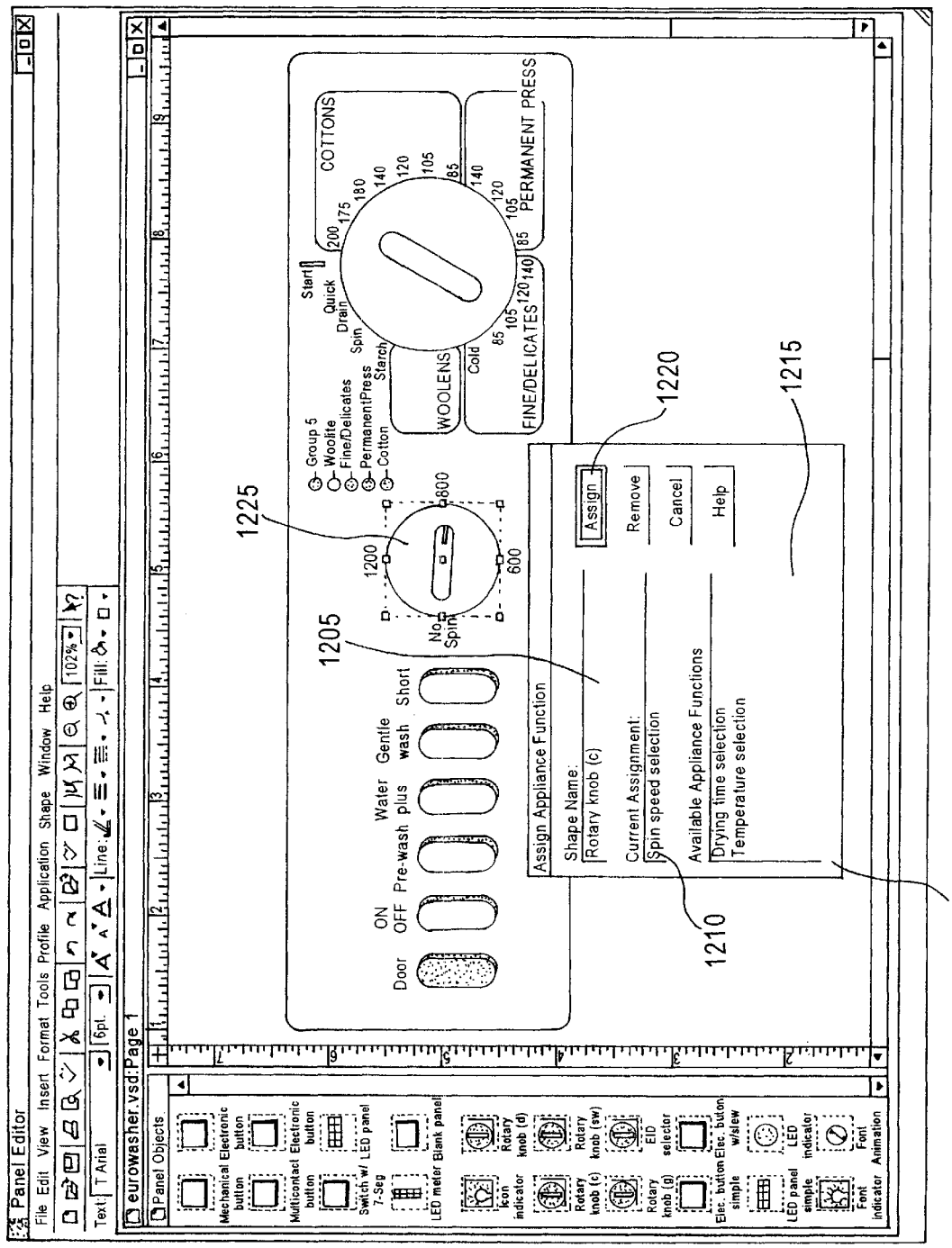

Referring to FIG. 12, an assign appliance function dialog 1200 is used to correlate the panel objects (e.g., the buttons, knobs, and display indicators) to operational functions of the appliance. To assign a function 851 to a panel object, the user selects the object and activates the assign appliance function dialog 1200. The dialog identifies the name 1205 of the object, the current assigned function 1210 for the object, and a list 1215 of all available appliance functions for the object type. The user uses the mouse to select one of the available functions from the list 1215 and then actuates an assign button 1220 to cause the selected function to become the current assigned function 1210. For example, as shown in FIG. 12, the spin speed selection function has been selected for the rotary knob 1225. This assignment determines how the control panel will communicate desired spin speed information to the controller of the washing machine.

Figure 13A:
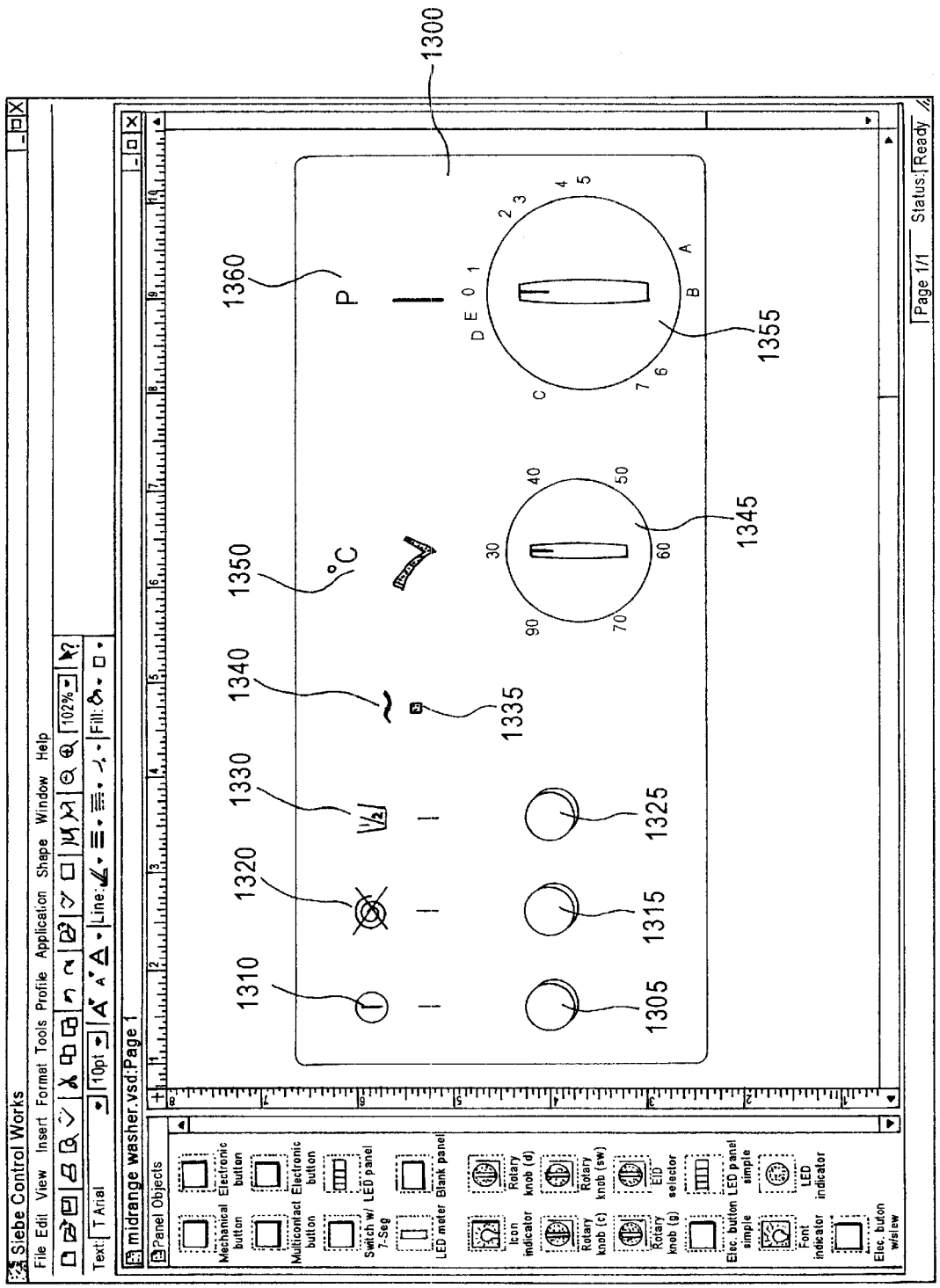
Figure 13B:
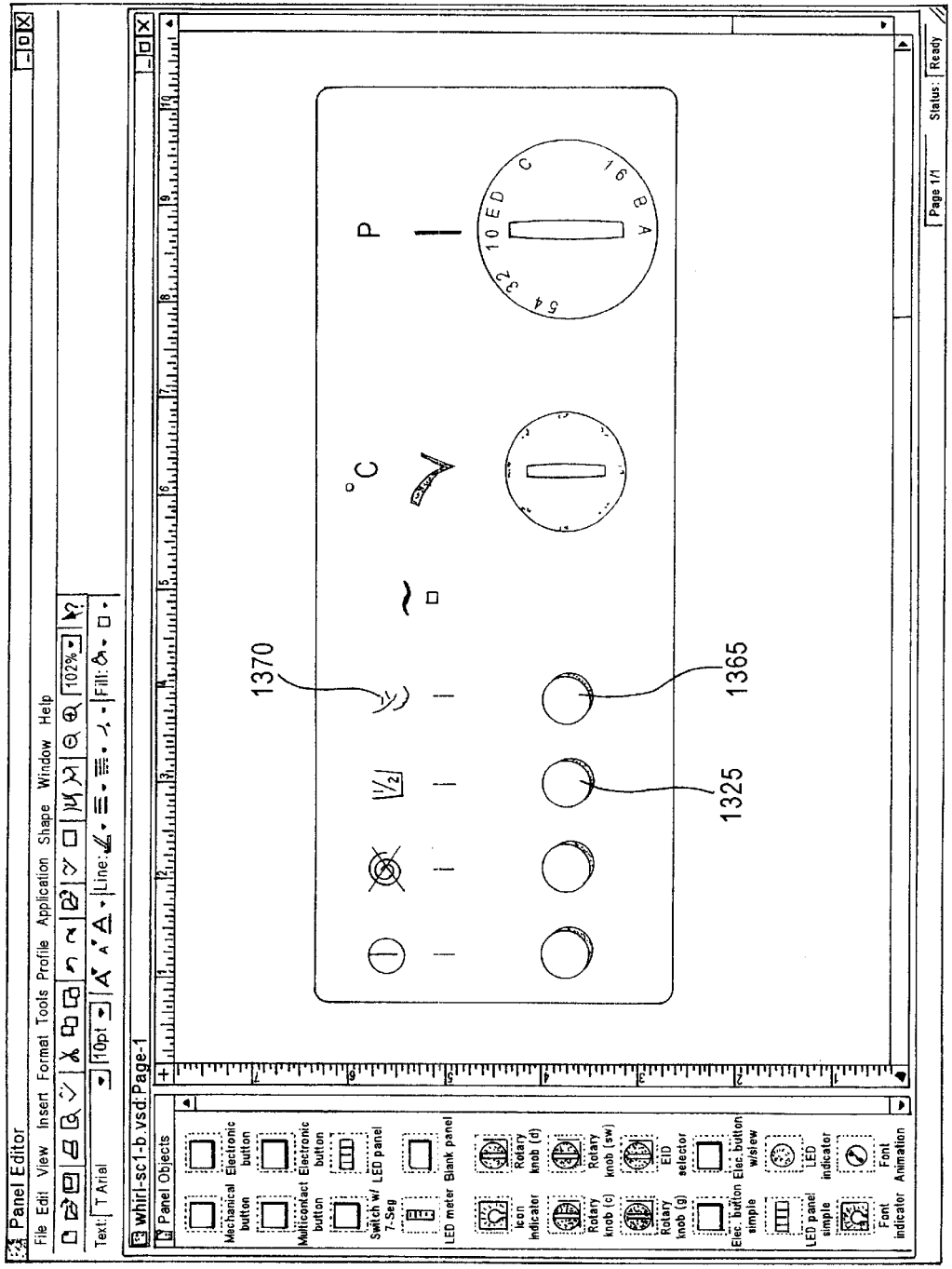

Referring to FIG. 13A, the panel building workbench 405 also may be used to edit an existing control panel 1300. As shown, the control panel 1300 includes a start program button 1305 with an associated icon 1310, a no spin option button 1315 with an associated icon 1320, a load size option button 1325 with an associated icon 1330, a cycle status indicator 1335 with an associated icon 1340, a water temperature setting knob 1345 with an associated icon 1350, and a wash program selection knob 1355 with an associated icon 1360. Referring also to FIG. 13B, a gentle wash cycle button 1365 may be added to the control panel by copying and pasting the load size option button 1325 to the desired location, and changing the associated icon 1370 to indicate gentle wash. The assign appliance function dialog 1200 then is used to assign a fragile textile function to the button 1365.

As noted above, the user also can edit the wash chart (i.e., the control logic) for the washer. Essentially, the wash chart is a collection of programs for different textiles. For example, a wash chart might include a program for synthetic textiles, a program for cotton textiles, a program for wool textiles, and a program for delicate textiles. Each program controls the duration and sequence of different stages of the wash cycle (e.g., fill, wash, rinse, or spin), and the motion, if any, of the washer drum during each stage. Each program may include optional components, such as pre-washing or temperature settings.

Figure 14:
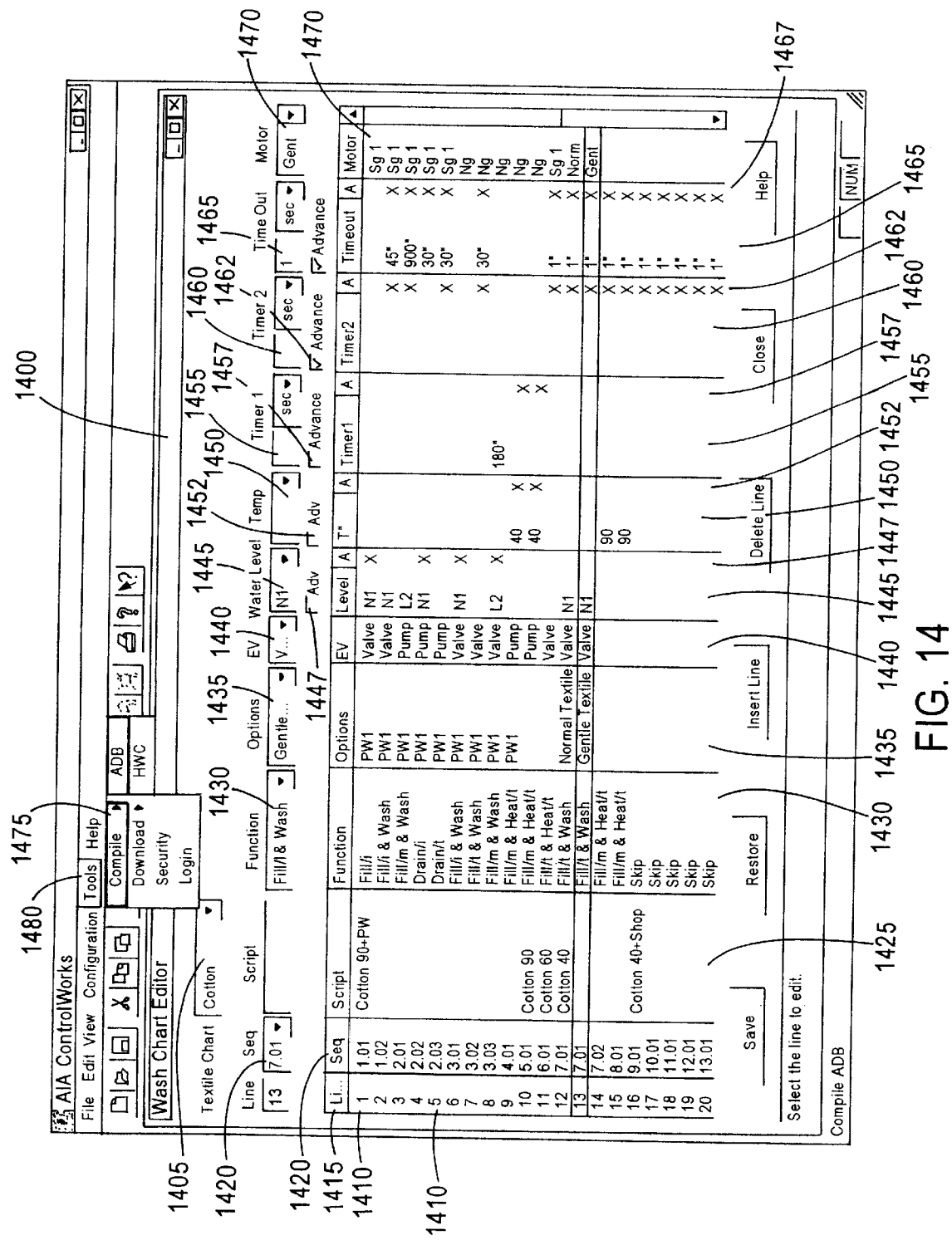

Referring to FIG. 14, the collection of textile programs that make up the wash chart may be edited by invoking a wash chart editor dialog 1400. Using the dialog 1400, the user selects a textile chart 1405 (e.g., cotton) to edit a particular textile program. The textile program is represented as a set of program lines 1410, each of which includes a line number 1415 and a sequence number 1420. A line number 1415 uniquely identifies a program line 1410. However, multiple lines can have the same sequence number. When this occurs, the line executed in the textile program varies based on a setting of the control panel. For example, lines 12 and 13 each have the sequence number 7.01. Line 13, which corresponds to gentle washing, is executed when the gentle wash button 1365 has been selected, while line 12, which corresponds to normal washing, is executed when the gentle wash button 1365 has not been selected.

Each line 1410 also includes a script field 1425, which labels the line, and a function field 1430, which identifies the function performed by the line. An options field 1435 identifies the conditions under which the line is implemented. For example, line 12 has an option label of Normal Textile, which indicates that line 12 is implemented when normal washing has been selected, while line 13 has an option label of Gentle Textile, which indicates that line 13 is implemented when gentle washing has been selected. Similarly, lines 1–9 include option labels of PW1, which indicates that these lines are implemented when prewashing has been selected.

An EV field 1440 indicates whether implementation of the line involves operation of a valve or pump of the washer. A level field 1445 indicates whether the valve or pump is operated until a designated water level is obtained. An associated advance field 1447 indicates whether the program advances to the next sequence number upon reaching the designated water level.

A temperature field 1450 indicates whether implementation of the line involves keeping or setting the water temperature to a desired value. An associated advance field 1452 indicates whether the program advances to the next sequence number upon reaching the designated temperature.

A timer1 field 1455 indicates whether a first timer is to be initiated by implementation of the line and the time value to which the timer is to be initiated. An associated advance field 1457 indicates whether the program advances to the next sequence number upon expiration of the first timer. A timer2 field 1460 and an associated advance field 1462 operate in the same way with respect to a second timer.

A timeout field 1465 indicates whether a value is to be set for a timeout timer that causes the program to advance to the next line. An associated advance field 1467 indicates that such an advance will occur whenever a value is provided for the timeout timer.

A motor profile field 1470 identifies a motor profile associated with the line. The motor profile controls how the washer motor is operated, and thereby controls drum motion. For example, the motor profile associated with step 12 is designated as "Normal", while the motor profile associated with step 13 is designated as "Gentle".

Figure 15:
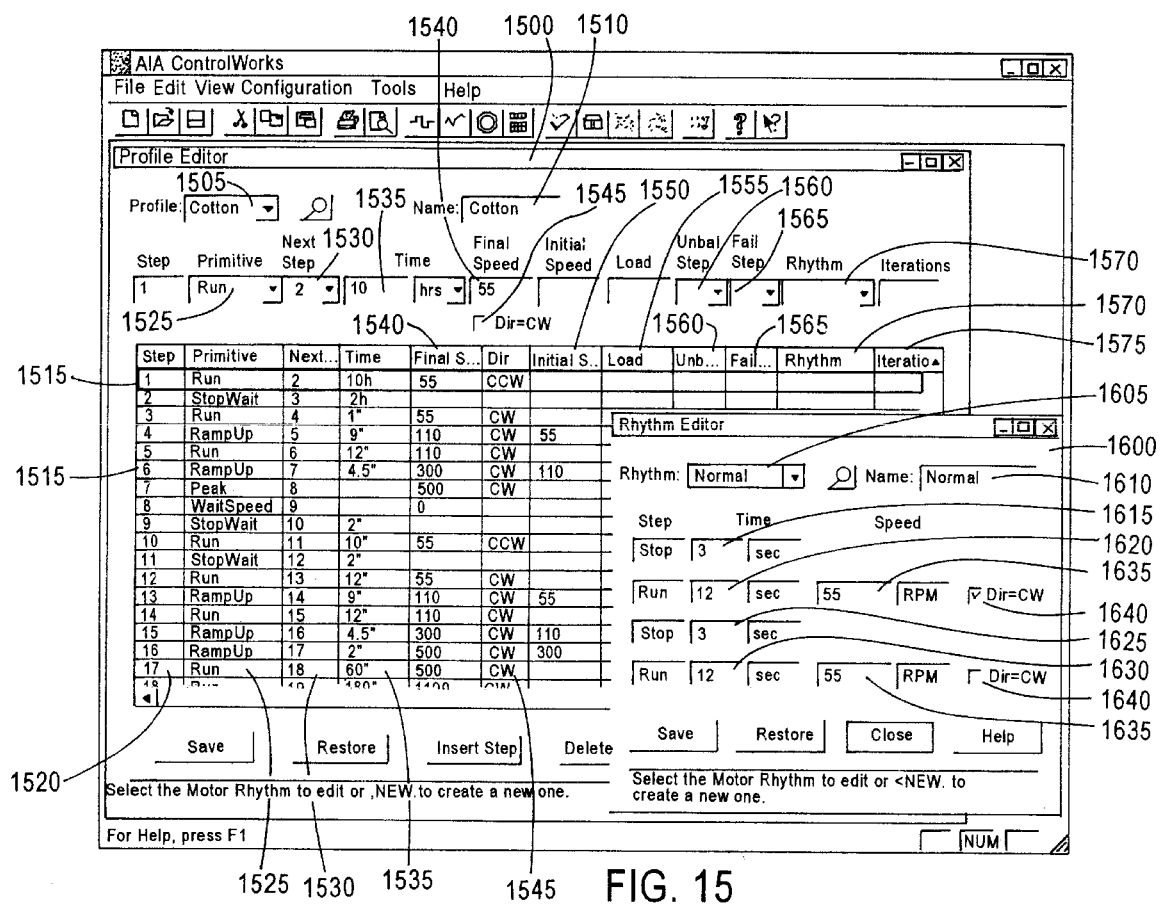

Referring to FIG. 15, a motor profile editor dialog 1500 permits the user to edit different motor profiles. The user selects a particular motor profile 1505 having an associated name 1510. The profile 1505 consists of a sequence of steps 1515, each of which has an associated step number 1520.

Each step 1515 has an associated motor operation function 1525. The motor operation functions define basic actions to be taken by the motor. In one implementation, the functions include StopWait, which causes the motor to stop driving the drum, but permits the drum to spin freely; Run, which causes the motor to run at a specified speed and direction of rotation; Ramp, which causes the motor to ramp its speed from a first speed to a second speed; Peak, which causes the motor to increase its speed until a desired speed is reached; EndSpin, which causes the motor to stop rotation of the motor drum; ChangeTarget, which causes the motor to change the desired rotation speed; SetUnb, which causes the motor to attempt to remove an unbalanced load condition; StartUnb, which causes the washer to indicate that an unbalanced load condition has occurred; TestUnb, which causes the washer to test for an unbalanced load condition; WaitSpeed, which causes the motor to permit the drum to decelerate until a desired speed is reached; and SpinRhythm, which causes the motor to spin the drum with a desired rhythm.

Each step also includes a next step field 1530 that indicates the next step to be performed by the motor. A time field 1535 indicates how long the motor should operate in the current step before advancing to the next step.

A final speed field 1540 indicates the desired rotation speed for the drum, and an associated direction field 1545 indicates the desired direction of rotation. An initial speed field 1550 indicates the starting rotation speed. This field is used by the Ramp function.

A load field 1555 indicates the amount of motor load that will trigger an unbalanced condition. This field is used by the TestUnb function.

An unbalanced step field 1560 indicates a step to be performed by the motor in the event that an unbalanced condition occurs. Similarly, a fail step field 1565 indicates a step to be performed by the motor in the event that the motor fails to achieve the conditions of the current function.

A rhythm field 1570 indicates a rhythm associated with the step. Finally, an iterations field 1575 indicates a number of iterations of the step to be performed. The iterations field is used by the SetUnb and SpinRhythm functions.

Figure 16:
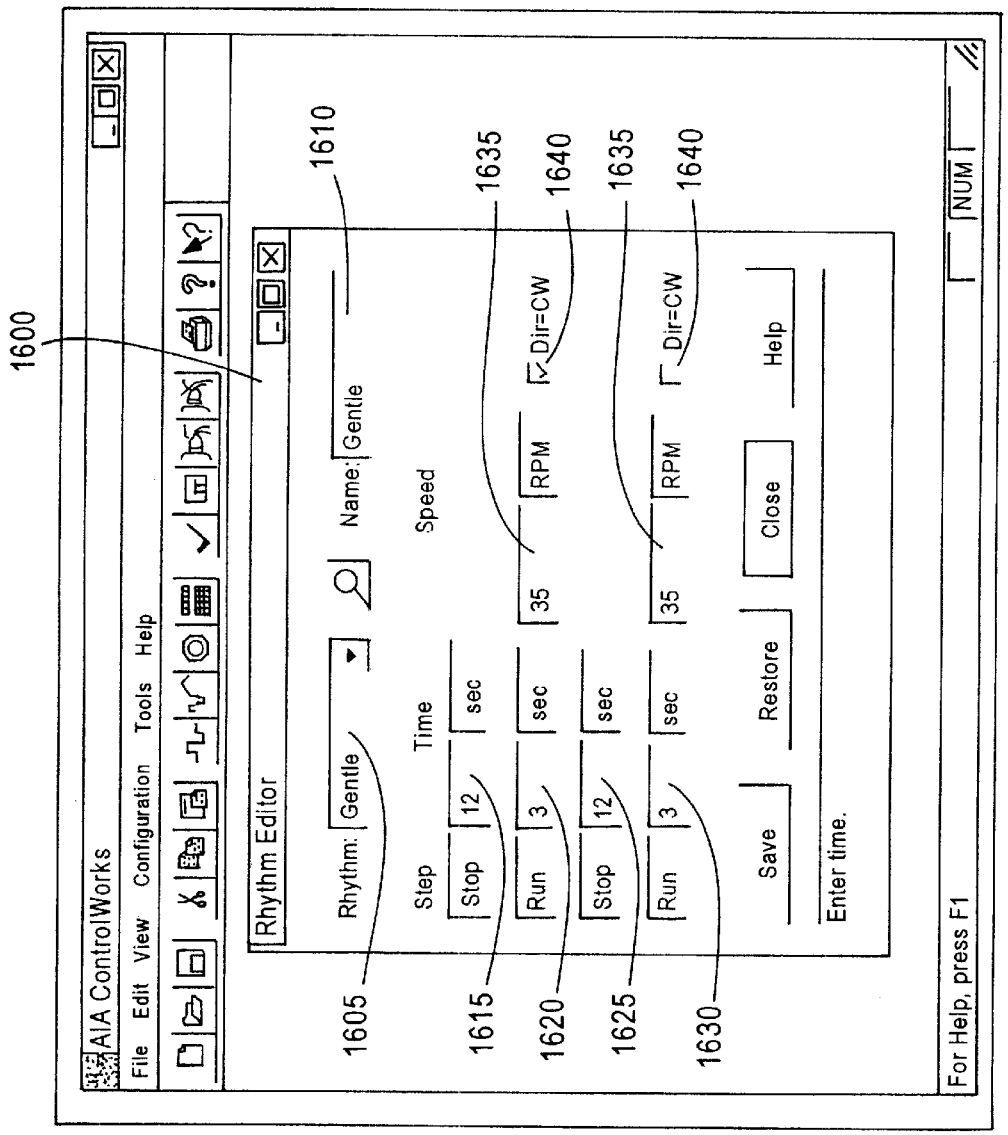

FIG. 15 also illustrates a rhythm editor dialog 1600 used to create a motor operation rhythm. The rhythm editor dialog 1600 permits the user to identify a rhythm 1605 having a name 1610. After identifying the rhythm, the user selects the durations of an initial stop period 1615, an initial run period 1620, a subsequent stop period 1625, and a subsequent run period 1630. The user also can separately designate the rotational speeds 1635 and directions 1640 for the two run periods 1620, 1630. For example, the normal rhythm shown in FIG. 15 causes the drum of the washer to stop for 3 seconds, rotate in a clockwise direction at 55 RPM for 12 seconds, stop for 3 seconds, and rotate in a counter-clockwise direction at 55 RPM for 12 seconds. By contrast, the gentle rhythm shown in FIG. 16 causes the drum of the washer to stop for 12 seconds, rotate in a clockwise direction at 35 RPM for 3 seconds, stop for 12 seconds, and rotate in a counter-clockwise direction at 35 RPM for 3 seconds.

Figure 17:
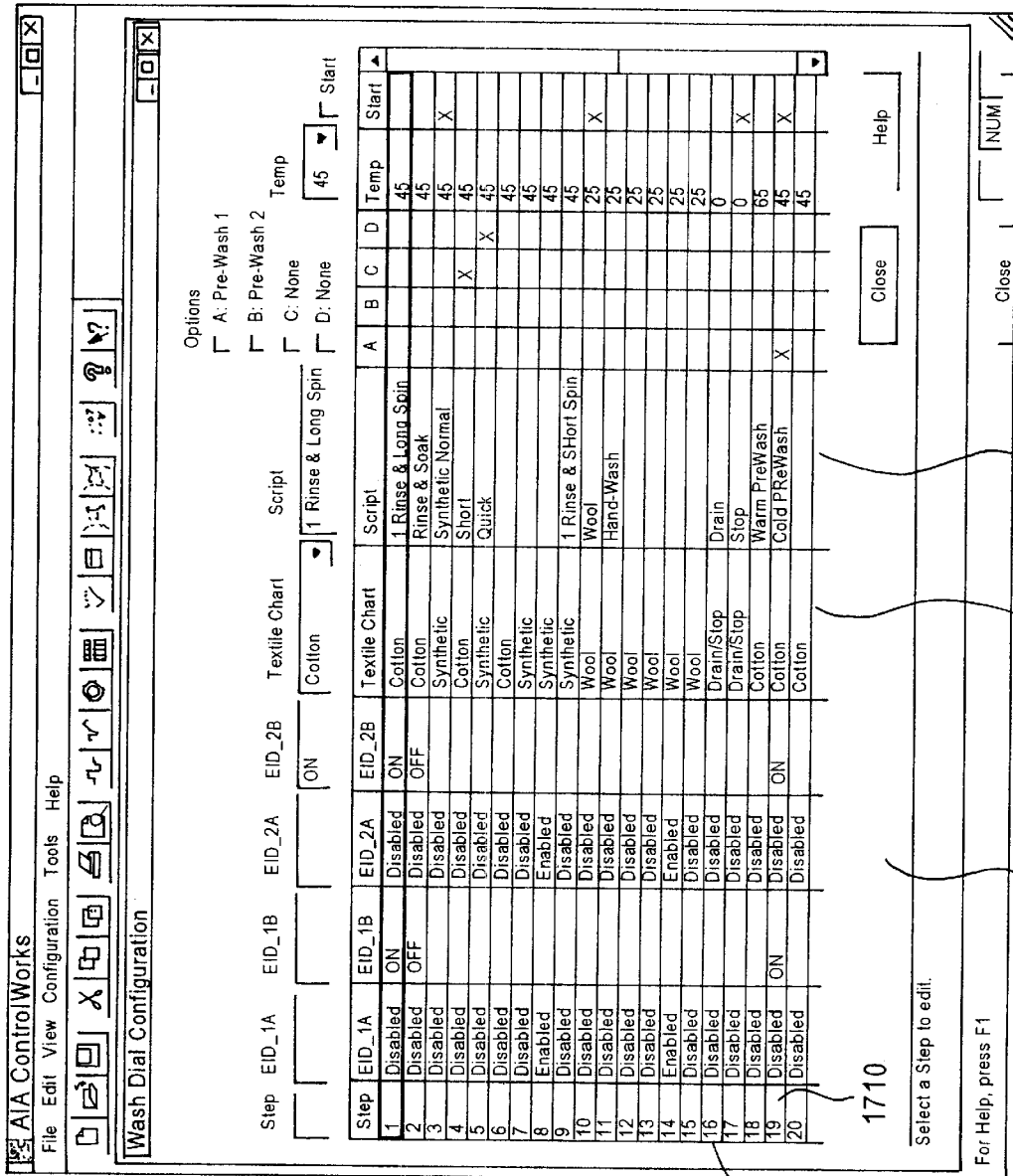

Referring to FIG. 17, a wash dial configuration profile 1700 may be used to configure how different textile programs and program steps correspond to positions of a dial on the control panel. Positions of the wash dial are designated by a series of steps 1705, each of which is identified by a step number 1710. A textile program 1715 and a position in the script 1720 of the textile program are associated with each step.

Referring again to FIG. 14, after making any other desired changes to the wash chart, the user generates the wash chart by selecting the link option 1475 from the tools menu 1480. The link option creates a data file that can be downloaded to the appropriate hardware for testing.

Figure 18:
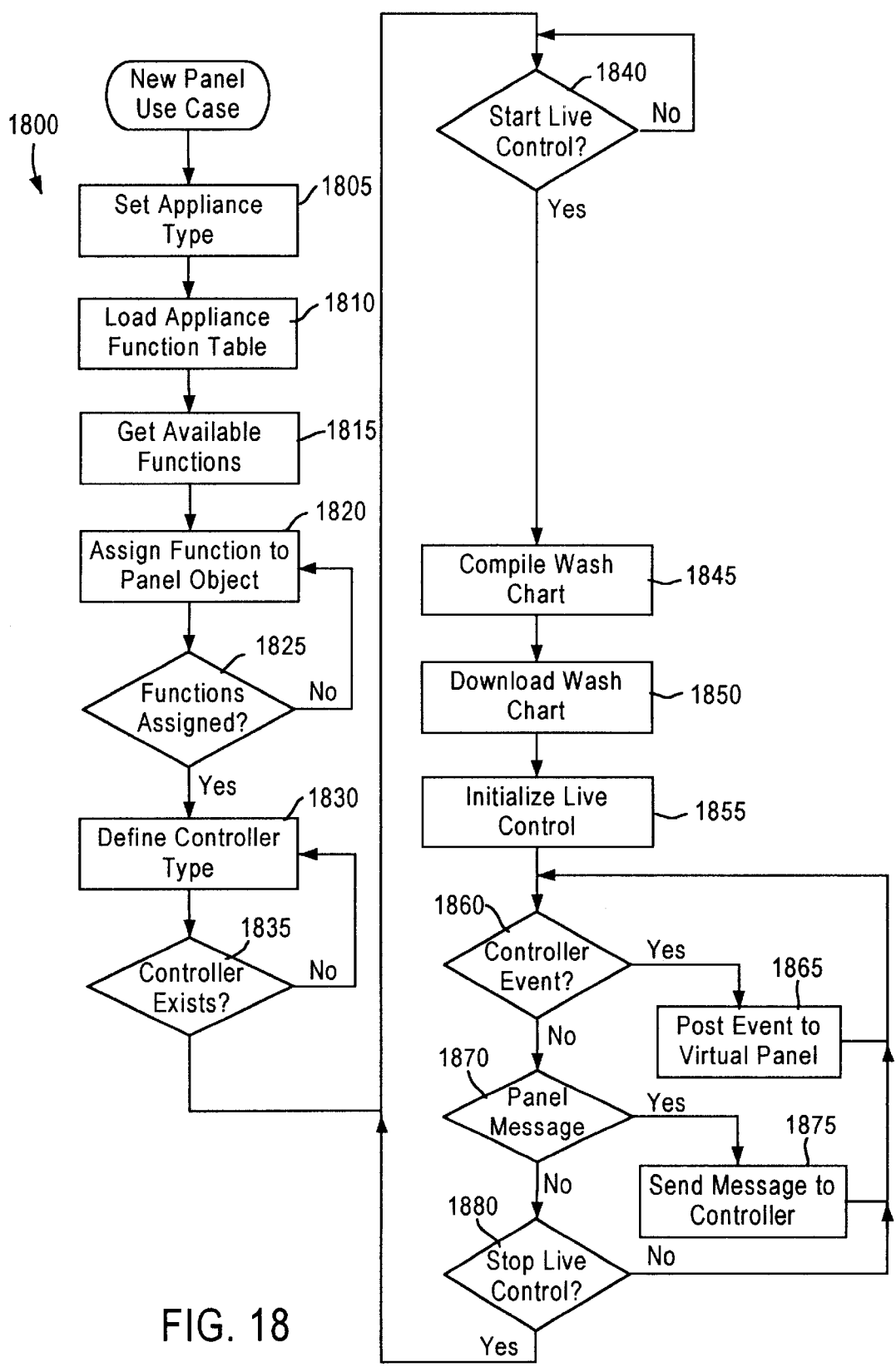
FIGS. 18 and 19 are flow charts of procedures for designing and testing appliance control systems.

Referring to FIG. 18, testing and refinement of a control system for an appliance using one implementation of the tool 105 may proceed according to a procedure 1800, referred to as an appliance functional interface ("AFI"). The AFI provides an interface between a virtual appliance control panel and the controller of an actual appliance. This allows the virtual panel to act as the user interface for the appliance in order to control the appliance as if the virtual panel is actually the appliance's control panel. The AFI provides a translation layer which translates an appliance function such as start bake or spin speed to a virtual panel object such as a display or a button.

Initially, the appliance type (e.g., clothes washer) is set (step 1805). Thereafter, an appliance function table for the selected appliance type is loaded (step 1810) and available functions for the appliance type are retrieved (step 1815).

Next, an appliance function is assigned to a panel object (step 1820). This step is repeated until all functions have been assigned to corresponding panel objects (step 1825).

Next, a controller type is defined for the appliance and its associated functions (step 1830). In general, the controller type is selected from a group of standard controller types (such as the standard hardware control modules illustrated in FIGS. 6A–6G and discussed above), and is selected based on performance requirements of the appliance type and the software needed to implement the appliance functions.

After verifying that the selected controller type is connected to the computer (step 1835), the procedure waits for the user to initiate live control of the appliance (step 1840). The following discussion of live control assumes that the appliance is a clothes washer. Live control of other appliances would proceed similarly.

To begin live control, the procedure compiles the wash chart for the appliance (step 1845) and downloads the wash chart to the controller (step 1850). The procedure then initializes live control of the controller by the virtual control panel (step 1855).

During live control, if a controller event is detected (step 1860), the procedure passes the event to the virtual panel (step 1865) to update the virtual panel. Similarly, if a panel message is detected (step 1870), the procedure passes the panel message (i.e., a virtual control signal) to the controller (step 1875). This continues until the user stops live control of the appliance (step 1880).

Figure 19:
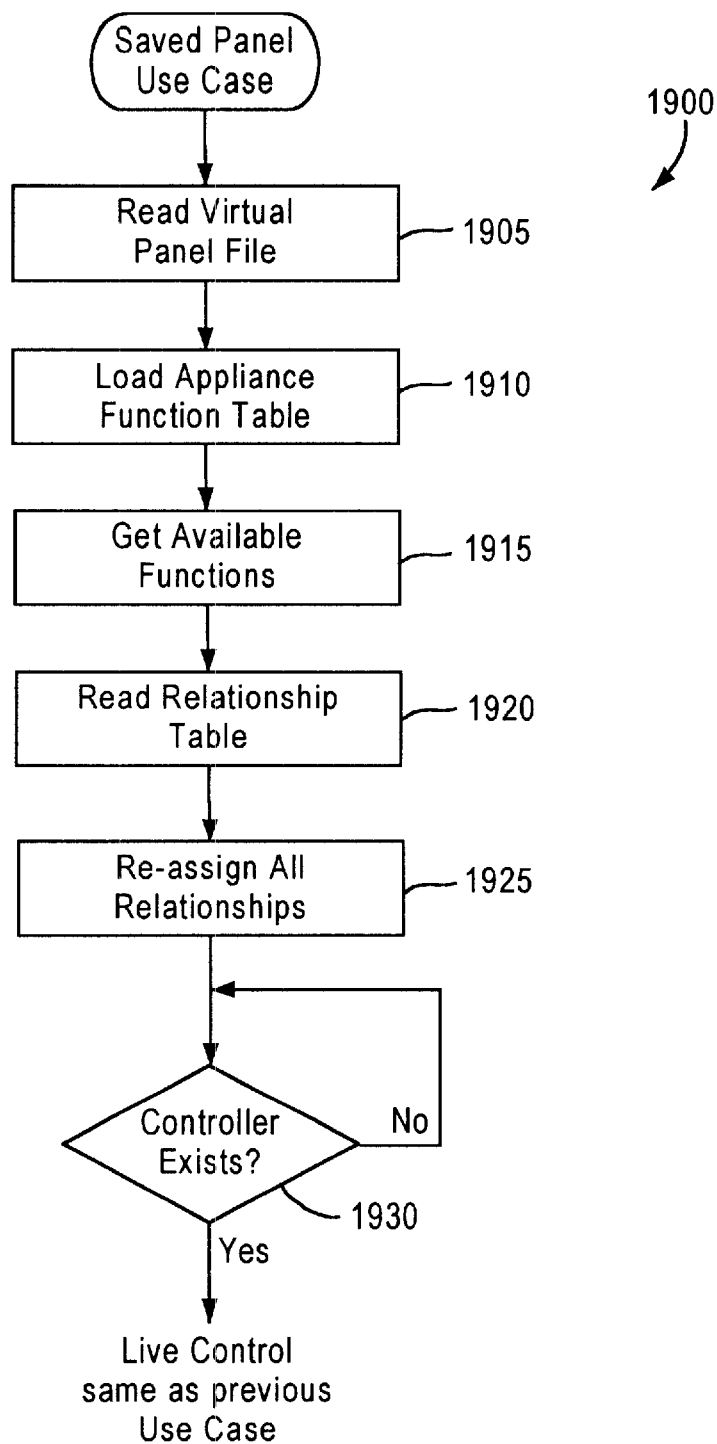

As illustrated by procedure 1900 of FIG. 19, the AFI operates similarly for the case in which all appliance functions have already been assigned to corresponding panel objects. Initially, a virtual panel file is read (step 1905) and an appropriate appliance function table is loaded (step 1910). Thereafter, available functions for the appliance type are retrieved (step 1915).

Next, a relationship table that links panel objects to appliance functions is retrieved (step 1920) and the relationships are re-assigned, if necessary, to reflect any changes in the control panel or the controller (step 1925). After verifying that the controller type from the virtual panel file is connected to the computer (step 1930), the procedure proceeds with live control as discussed above.

Figure 20:
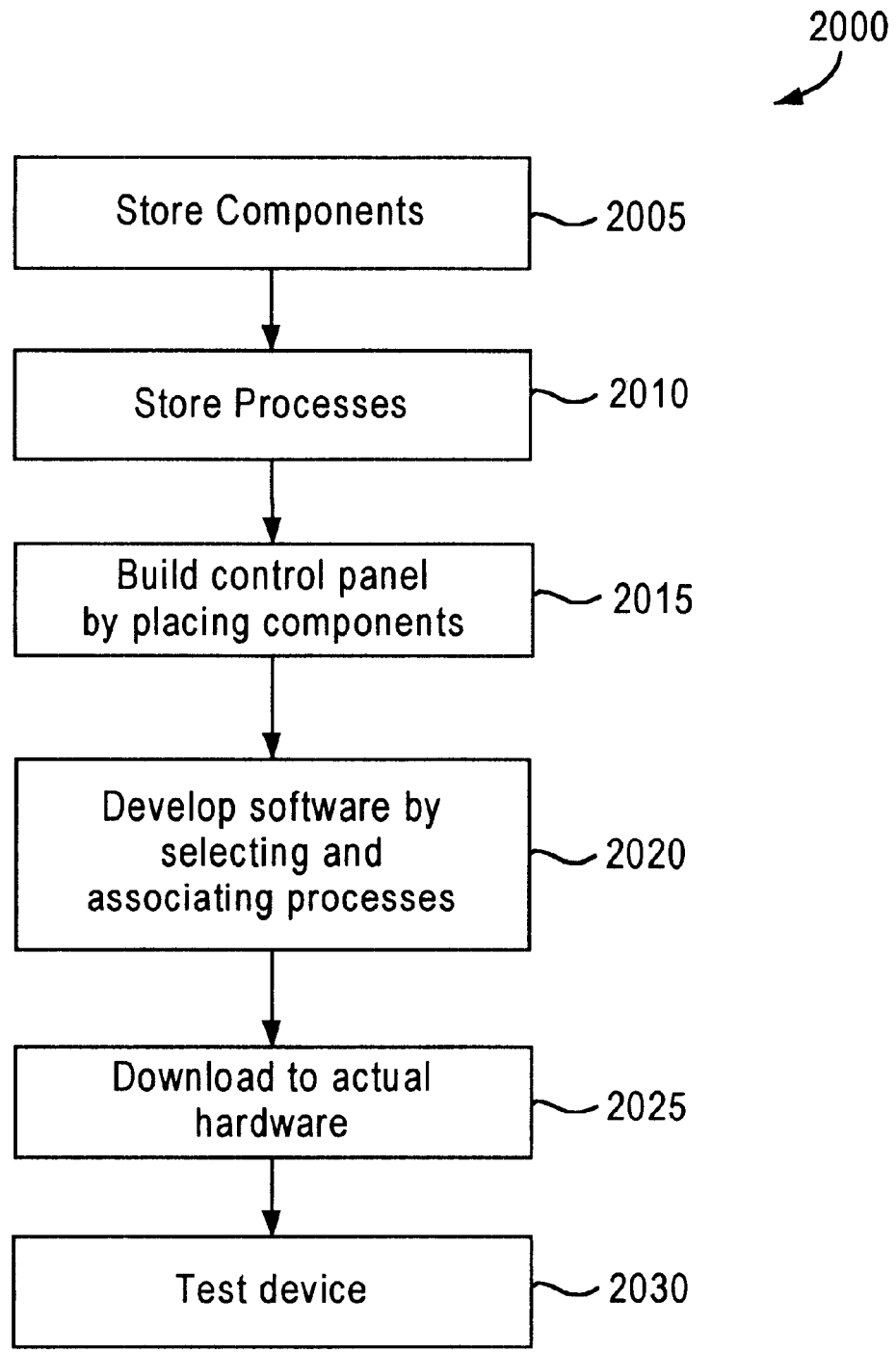
FIG. 20 is a flow chart of a procedure for designing and testing a control system for a device.

In summary, a control system for a device, such as an appliance, may be generated according to the procedure 2000 illustrated in FIG. 20. First, software representations of pre-existing control panel components and control processes are stored on a computer (steps 2005 and 2010). In general, the software representations constitute reusable, pre-tested modules. The computer then is used to develop a control panel for the device by selecting and placing software representations of preexisting control panel objects in a software representation of the control panel (step 2015). The computer is also used to develop control software for the device by selecting software representations of pre-existing control processes and associating the selected control processes with the selected control panel objects (step 2020). The control software is downloaded from the computer to control hardware to be included in the device (step 2025). Finally, the device is tested using the control software running on the control hardware and under the control of the computer (step 2030).

Figure 21:
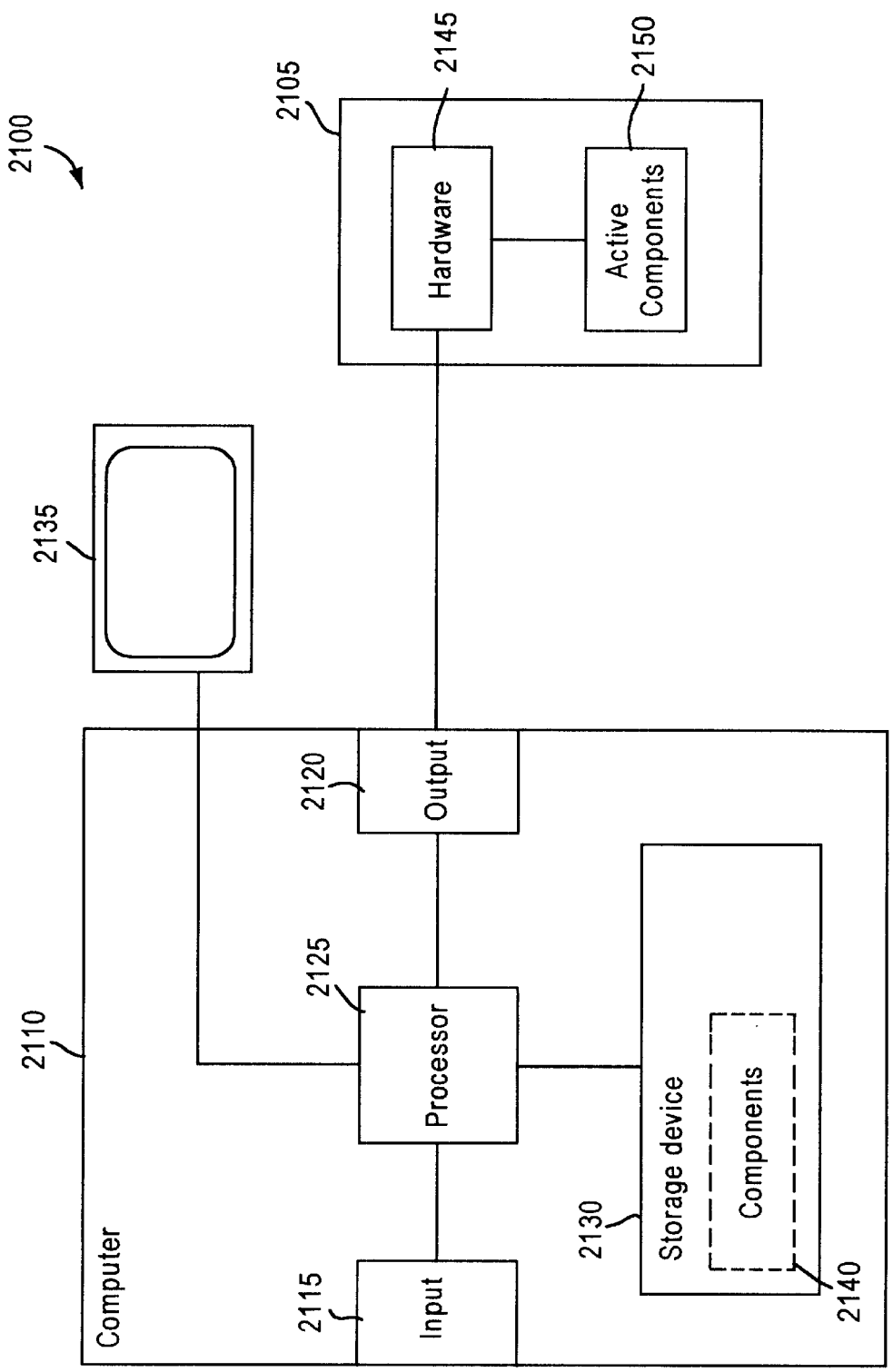
FIG. 21 is a block diagram of a system for designing and testing a control system for a device.

FIG. 21 illustrates a system 2100 for generating a control system for a device 2105. The system includes a computer 2110 having an input unit 2115, an output unit 2120, a processor 2125, a storage device 2130, and a display 2135. Software representations 2140 of pre-existing control panel components are stored on the storage device 2130. The system also includes control hardware 2145 connectable to active components 2150 of the device 2105 and operable to receive data from the output unit 2120 of the computer 2110. The processor 2125 is programmed to present a representation of a control panel on the display, to permit a user to develop the control panel and control software for the device by using the input device to select and place representations of pre-existing control panel components on the displayed representation of the control panel, to download the control software from the computer to the control hardware through the output unit, and to test the device using the control software running on the control hardware and under the control of the computer through the output unit.

Other embodiments are within the scope of the following claims. For example, the functions of generating the control panel and control software may be implemented separately from the testing function. In one aspect of this, the control panel and control software are generated using a computer, and then are downloaded, by, for example, an infrared link, to a personal digital assistant ("PDA") that is connected to the appliance and used to control the appliance.

What is claimed is:

1. A method of designing a control system for a device, the method comprising:

storing software representations of pre-existing control panel components on a computer;

storing software representations of pre-existing control processes on the computer;

using the computer to develop a control panel for the device by selecting and placing software representations of pre-existing control panel objects in a software representation of the control panel;

using the computer to develop control software for the device by selecting software representations of pre-existing control processes and associating the selected control processes with the selected control panel objects;

downloading the control software from the computer to control hardware to be included in the device; and testing the device using the control software running on the control hardware and under the control of the computer;

generating a virtual control panel at the computer, the virtual control panel embodying the control panel designed for the device;

permitting a user to manipulate the virtual control panel to generate virtual control inputs; and transmitting the virtual control inputs to the control hardware to control the control hardware.

2. The method of claim 1, wherein transmitting the virtual control inputs comprises transmitting the virtual control inputs using a communications protocol.

3. The method of claim 1, wherein the control hardware comprises a standard hardware control module for implementing the control software and having a communications interface, the method further comprising:

connecting the standard hardware control module to operating components of the device; and connecting the standard hardware control module to the computer through the communications interface.

4. The method of claim 3, further comprising, after testing the device, including copies of the standard hardware control module in production versions of the device.

5. The method of claim 3, further comprising selecting the standard hardware control module from a set of predefined standard hardware control modules.

6. The method of claim 1, wherein the control hardware comprises a collection of standard hardware control modules, the method further comprising selecting one or more standard hardware control modules from the collection and including copies of the selected standard hardware control modules in production versions of the device.

7. The method of claim 1, further comprising storing software representations of active device components, wherein using the computer to develop the control panel and the control software for the device further comprises selecting one or more representations of active device components and associating the selected active device components with one or more selected control processes or selected control panel objects.

8. The method of claim 1, wherein a software representation of a pre-existing control process comprises a list of sequential control steps.

9. The method of claim 1, wherein a software representation of a pre-existing control process comprises a state machine.

10. The method of claim 1, wherein using the computer to develop a control panel and control software for the device comprises using graphical techniques to display the software representation of the control panel and to select and place software representations of the control panel components on the displayed software representation of the control panel.

11. The method of claim 10, further comprising representing the software representations of control panel components using displayed icons.

12. The method of claim 11, further comprising displaying a selected icon as a three-dimensional representation of a corresponding control panel component.

13. The method of claim 10, wherein using graphical techniques comprises using a graphical drawing tool.

14. The method of claim 13, wherein the graphical drawing tool displays icons representing the pre-existing control processes.

15. The method of claim 1, wherein the device comprises an appliance.

16. The method of claim 15, wherein the appliance comprises a clothes washer.

17. The method of claim 1, further comprising using a computer-controlled modelling system to generate a three-dimensional model of the control panel.

18. The method of claim 1, further comprising storing pre-existing control software in the control hardware.

19. The method of claim 18, wherein downloading the control software from the computer to the control hardware comprises adding one or more modules to the pre-existing control software.

20. The method of claim 18, wherein downloading the control software from the computer to the control hardware comprises replacing one or more modules of the pre-existing control software.

21. The method of claim 1, further comprising using the computer to automatically generate a design specification from the control panel.

22. The method of claim 1, further comprising:

providing a collection of standard hardware control modules, each control module being capable of running standard software and having different performance characteristics; and selecting one or more of the standard hardware control modules as the control hardware for the device based on performance characteristics required by the control panel and the control software.

23. The method of claim 22, wherein selecting one or more of the standard hardware control modules comprises having the computer automatically select the one or more of the standard hardware control modules based on performance characteristics required by the control panel and the control software.

24. A method of designing control software for a device, the method comprising:

storing software representations of pre-existing control processes on a computer;

using the computer to develop control software for the device by selecting software representations of pre-existing control processes and associating the selected control processes with each other;

downloading the control software from the computer to control hardware to be included in the device; and testing the device using the control software running on the control hardware;

generating a virtual control panel for the device at the computer;

permitting a user to manipulate the virtual control panel to generate virtual control inputs;

transmitting the virtual control inputs to the control hardware to control the control hardware.

25. The method of claim 24, wherein the control hardware comprises a standard hardware control module for implementing the control software and having a communications interface, the method further comprising:

connecting the standard hardware control module to active components of the device; and connecting the standard hardware control module to the computer through the communications interface.

26. The method of claim 24, further comprising having the computer automatically generate a list of control panel components needed for a control panel of the device based on requirements of the control software.

27. The method of claim 24, further comprising:

storing software representations of pre-existing control panel components on the computer;

using the computer to develop a control panel for the device by selecting and placing software representations of pre-existing control panel objects in a software representation of the control panel; and associating the selected control processes with the selected control panel objects.

28. The method of claim 24, wherein the control hardware comprises a standard hardware control module for implementing the control software and having a communications interface, the method further comprising:

connecting the standard hardware control module to operating components of the device; and connecting the standard hardware control module to the computer through the communications interface.

29. The method of claim 24, further comprising storing software representations of active device components, wherein using the computer to develop the control software for the device further comprises selecting one or more representations of active device components and associating the selected active device components with one or more selected control processes.

30. The method of claim 24, wherein using the computer to develop control software for the device comprises using graphical techniques to display the software representations of the pre-existing control processes.

31. The method of claim 30, wherein using graphical techniques comprises using a graphical drawing tool that displays icons representing the pre-existing control processes.

32. The method of claim 24, further comprising storing pre-existing control software in the control hardware.

33. The method of claim 32, wherein downloading the control software from the computer to the control hardware comprises adding one or more modules to the pre-existing control software.

34. The method of claim 32, wherein downloading the control software from the computer to the control hardware comprises replacing one or more modules of the pre-existing control software.

35. The method of claim 24, further comprising:

providing a collection of standard hardware control modules, each control module being capable of running standard software and having different performance characteristics; and selecting one or more of the standard hardware control modules as the control hardware for the device based on performance characteristics required by the control software.

36. The method of claim 35, wherein selecting one or more of the standard hardware control modules comprises having the computer automatically select the one or more of the standard hardware control modules based on performance characteristics required by the control software.

37. A method of designing a control panel for a device, the method comprising:

storing software representations of pre-existing control panel components on a computer;

using the computer to develop a control panel for the device by selecting and placing software representations of pre-existing control panel objects in a software representation of the control panel;

testing the device by running the control hardware under the control of the control panel on the computer;

generating a virtual control panel at the computer, the virtual control panel embodying the control panel designed for the device;

permitting a user to manipulate the virtual control panel to generate virtual control inputs; and transmitting the virtual control inputs to the control hardware to control the control hardware.

38. The method of claim 37, wherein transmitting the virtual control inputs comprises transmitting the virtual control inputs using a communications protocol.

39. The method of claim 37, wherein using the computer to develop the control panel for the device comprises using graphical techniques to display the software representation of the control panel and to select and place software representations of the control panel components on the displayed software representation of the control panel.

40. The method of claim 39, further comprising representing the software representations of control panel components using displayed icons.

41. The method of claim 40, further comprising displaying a selected icon as a three-dimensional representation of a corresponding control panel component.

42. The method of claim 39, wherein using graphical techniques comprises using a graphical drawing tool.

43. The method of claim 37, further comprising using a computer-controlled modelling system to generate a three-dimensional model of the control panel.

44. The method of claim 37, further comprising using the computer to automatically generate a design specification from the control panel.

45. A method of generating a design specification for a control panel for a device, the method comprising:

using a computer to graphically generate a control panel for a device; and using the computer to automatically generate the design specification from the control panel.

46. The method of claim 45, wherein using the computer to graphically generate the control panel for the device comprises using one or more pre-existing objects.

47. The method of claim 45, wherein a pre-existing object includes a graphical representation of a physical embodiment of the object and a logical representation of operation of the object.

48. A method of designing a control system for a device, the method comprising:

providing a collection of standard hardware control modules, each control module being capable of running standard software and having difficult performance characteristics;

using a computer to develop a control panel and control software for the device;

selecting one or more of the standard hardware control modules to be included in the device based on performance characteristics required by the control panel and control software; wherein selecting one or more of the standard hardware control modules comprises having the computer automatically select the one or more of the standard hardware control modules based on performance characteristics required by the control panel and the control software.

49. The method of claim 48, further comprising storing software representations of pre-existing control panel components on a computer, wherein using the computer to develop the control panel and the control software comprises selecting and placing software representations of pre-existing control panel components on a software representation of the control panel.

50. The method of claim 49, further comprising storing software representations of pre-existing control processes on the computer, wherein using the computer to develop the control panel and the control software for the device comprises:

selecting and placing pre-existing representations of control panel components;

selecting one or more pre-existing control processes;

associating each of the selected control operations with a selected control panel component; and generating the control software by manipulating the software representations of the control panel components and the software representations of the one or more pre-existing control processes.

51. The method of claim 48, further comprising:

connecting one or more of the standard hardware control modules to active components of the device;

downloading the control software from the computer to the connected standard hardware control modules; and testing the device using the control software running on the connected standard hardware control modules under control of the computer.

52. The method of claim 51, further comprising:

generating a virtual control panel at the computer, the virtual control panel embodying the control panel designed for the device;

permitting a user to manipulate the virtual control panel to generate virtual control inputs; and transmitting the virtual control inputs to the connected standard hardware control modules to control the device.

53. The method of claim 52, wherein transmitting the virtual control inputs comprises transmitting the virtual control inputs over a pair of wires using a communications protocol.

54. A system for designing a control system for a device, the system comprising:

a computer having an input unit, an output unit, a processor, a storage device, and a display;

software representations of pre-existing control panel components stored on the storage device; and control hardware connectable to active components of the device and operable to receive data from the output unit of the computer;

wherein the processor is programmed to:

present a representation of a control panel on the display, permit a user to develop the control panel and control software for the device by using the input device to select and place representations of pre-existing control panel components on the displayed representation of the control panel, download the control software from the computer to the control hardware through the output unit;

test the device using the control software running on the control hardware and under the control of the computer through the output unit;

display a virtual control panel on the display, the virtual control panel embodying the control panel designated for the device;

permit the user to use the input unit to manipulate the virtual control panel to generate virtual control inputs; and transmit the virtual control inputs to the control hardware through the output unit to control.

55. The system of claim 54, wherein the output unit comprises a pair of wires connected to the control hardware and transmitting the virtual control inputs comprises transmitting the virtual control inputs over the pair of wires using a communications protocol.

56. The system of claim 54, wherein the control hardware comprises a standard hardware control module for implementing the control software and having a communications interface, the standard hardware control module being connected to active components of the device, and being connected to the computer through the communications interface.

57. The system of claim 54, further comprising software representations of standard control operations stored on the storage device, wherein:

the processor is programmed to permit the user to:

select and place multiple ones of the standard representations of control panel components;

select one or more standard control operations; and associate each of the selected control operations with a selected standard representation of a control panel component; and the processor is programmed to generate the control software by manipulating the software representations of the control panel components and the software representations of the one or more standard control operations.

58. The system of claim 54, wherein the device comprises an appliance.

59. The system of claim 58, wherein the appliance comprises a clothes washer.

60. The system of claim 54, further comprising a computer-controlled modelling system connected to the computer and operable to generate a three-dimensional model of the control panel.

61. The system of claim 54, wherein the control hardware comprises standard control software.

62. The system of claim 61, wherein downloading the control software from the computer to the control hardware comprises adding one or more modules to the standard control software.

63. The system of claim 61, wherein downloading the control software from the computer to the control hardware comprises replacing one or more modules of the standard control software.

64. The system of claim 54, wherein the processor is further programmed to automatically generate a design specification from the control panel.

* * * * *